(12) United States Patent
Shimizu

(10) Patent No.: US 7,966,869 B2
(45) Date of Patent: Jun. 28, 2011

(54) APPARATUS AND METHOD FOR DETECTING CAM PHASE OF ENGINE

(75) Inventor: Hirokazu Shimizu, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 12/145,973

(22) Filed: Jun. 25, 2008

(65) Prior Publication Data

US 2009/0007646 A1 Jan. 8, 2009

(30) Foreign Application Priority Data

Jul. 6, 2007 (JP) ................................. 2007-178643
Mar. 5, 2008 (JP) ................................. 2008-055062

(51) Int. Cl.
*G01M 15/00* (2006.01)
(52) U.S. Cl. ................................. 73/114.27; 73/114.26
(58) Field of Classification Search ............... 73/114.26, 73/114.27
See application file for complete search history.

(56) References Cited

U.S. PATENT DOCUMENTS

| | | | | |
|---|---|---|---|---|
| 5,604,304 | A * | 2/1997 | Kokubo et al. ............. | 73/114.63 |
| 6,101,442 | A | 8/2000 | Lewandowski et al. | |
| 6,483,312 | B2 * | 11/2002 | Shimizu et al. ............... | 324/391 |
| 6,484,676 | B2 * | 11/2002 | Shimizu et al. ............. | 123/90.15 |
| 6,505,128 | B1 * | 1/2003 | Shimizu et al. ................ | 702/33 |
| 6,626,030 | B2 * | 9/2003 | Shimizu ..................... | 73/114.27 |
| 6,691,024 | B2 * | 2/2004 | Kunz ........................... | 701/114 |
| 6,745,121 | B2 | 6/2004 | Watanuki et al. | |
| 6,784,658 | B2 * | 8/2004 | Kawagoe et al. ............ | 324/163 |
| 6,863,037 | B2 * | 3/2005 | Iizuka et al. ............... | 123/90.17 |
| 6,874,359 | B2 * | 4/2005 | Shimizu ..................... | 73/114.27 |
| 6,907,342 | B1 * | 6/2005 | Matsuoka ..................... | 701/113 |
| 7,017,556 | B2 * | 3/2006 | Borg et al. .................... | 123/491 |
| 7,182,062 | B2 * | 2/2007 | Beer et al. ..................... | 123/305 |
| 7,188,020 | B2 * | 3/2007 | Yasui et al. ................... | 701/103 |
| 7,349,796 | B2 * | 3/2008 | Toyama et al. ............... | 701/114 |
| 2002/0007244 | A1 * | 1/2002 | Shimizu ........................ | 701/113 |
| 2006/0293830 | A1 * | 12/2006 | Toyama et al. ............... | 701/114 |

FOREIGN PATENT DOCUMENTS

| | | |
|---|---|---|
| JP | 11-229948 (A) | 8/1999 |
| JP | 2000-240478 (A) | 9/2000 |
| JP | 2001-214789 (A) | 8/2001 |
| JP | 2003-120349 (A) | 4/2003 |
| JP | 2003-184516 A | 7/2003 |
| JP | 2004-44470 (A) | 2/2004 |
| JP | 2005-264764 (A) | 9/2005 |
| JP | 2005-291141 A | 10/2005 |
| JP | 2007-120406 A | 5/2007 |
| JP | 2008-025541 A | 2/2008 |

* cited by examiner

*Primary Examiner* — Freddie Kirkland, III
(74) *Attorney, Agent, or Firm* — Foley & Lardner LLP

(57) ABSTRACT

An apparatus and method for detecting a cam phase of an engine provided with a variable valve timing mechanism able to vary a rotating phase of a camshaft relative to a crankshaft of the engine, which apparatus and method can detect the rotating phase in a short cycle. There is provided a cam angle sensor having a configuration of outputting a cam angle signal at each time when the camshaft rotates by a unit angle. At the same time, by lengthening an output cycle of the cam angle signal on a part thereof or by using a second cam angle sensor able to detect a reference cam angle position, a cam angle position to which individual cam angle signal corresponds is detected. Then, the rotating phase of the camshaft relative to the crankshaft can be detected, based on the detection result of the cam angle position based on the cam angle signal.

17 Claims, 30 Drawing Sheets

APPARATUS AND METHOD FOR DETECTING CAM PHASE OF ENGINE

BACKGROUND OF THE INVENTION

1. Field of the Invention

The present invention generally relates to a cam phase detecting apparatus for an engine and a cam phase detecting method of the engine and, in particular, relates to a technique for detecting a rotating phase of a camshaft relative to a crankshaft of an engine.

2. Description of the Related Art

Japanese Laid-open (Kokai) Patent Application Publication No. 2005-291141 discloses a six-cylinder engine provided with a variable valve timing mechanism operative for varying a rotating phase of a camshaft relative to a crankshaft.

The above-mentioned six-cylinder engine is provided with a cylinder discriminating sensor and a rotating speed sensor. The former sensor has three teeth formed at even intervals on an outer periphery of a rotor mounted on the camshaft and generates a cylinder discriminating signal by the detection of each of the three teeth by means of an electromagnetic pickup. The latter sensor has a set of teeth formed angularly at each 10 deg on an outer periphery of a rotor mounted on the crankshaft and generates a unit angle signal by the detection of each of the set of teeth by means of an electromagnetic pickup.

Then, the rotating phase of the camshaft relative to the crankshaft is detected from detection of a difference in the rotating phase from an instant of generation of the cylinder discriminating signal to an instant of generation of the unit angle signal corresponding to the reference position of a piston.

Further, discrimination of a cylinder of which the associated piston arrives at the reference position thereof is executed based on whether or not generation of the cylinder discriminating signal occurs during a detection period established based on the above-mentioned unit angle signals.

As described hereinbefore, in the case where the detection of the rotating phase of the camshaft is executed based on a time difference between the detection time of a reference angle position of the camshaft and that of a reference angle position of the crankshaft, the rotating phase is detected at every instant of occurrence of the reference angle position of the camshaft.

Accordingly, there exists a problem such that, when an engine rotating speed decreases, a detection cycle of the rotating phase necessarily becomes long and therefore, feedback control of the variable valve timing mechanism cannot often be achieved at a high speed with high accuracy.

SUMMARY OF THE INVENTION

In view of the above problem, an object of the present invention is to provide a cam phase detecting apparatus along with a cam phase detecting method, which enable it to detect a rotating phase of a camshaft relative to a crankshaft in a sufficiently short cycle even when an engine rotating speed is low.

In order to achieve the above object, according to the present invention, there is provided a cam angle sensor which outputs a cam angle signal cyclically at each time when a camshaft is rotated by a unit angle, and has a configuration such that an output cycle of the cam angle signals is set to have an angle from one to a coming cam signal that is differentiated from the unit angle in at least one portion per one complete rotation of the camshaft. In addition, according to the present invention, detection of the portion where the angular amount during the output cycle of the cam angle signal is different from the unit angle is always executed thereby detecting a cam angle position to which individual cam angle signal corresponds, and a rotating phase of the camshaft relative to a crankshaft is detected based on the detecting result of the cam angle position.

Further, according to the present invention, there are provided a first cam sensor, which outputs a first cam angle signal at each time when the camshaft is rotated by the unit angle and a second cam sensor, which outputs a second cam angle signal for discriminating at least one reference cam angle position of the camshaft. Then, an arrangement is further provided in which a reference crank angle position of the crankshaft is detected and the first cam angle signal is discriminated on the basis of the reference cam angle position discriminated based on the second cam angle signal, thereby detecting the rotating phase of the camshaft relative to the crankshaft based on a phase difference between the discriminated first cam angle signal and the reference crank angle position.

The above and other objects and features of this invention will become understood from the following description with reference to the accompanying drawings.

DESCRIPTION OF THE PREFERRED EMBODIMENTS

Figure 1:
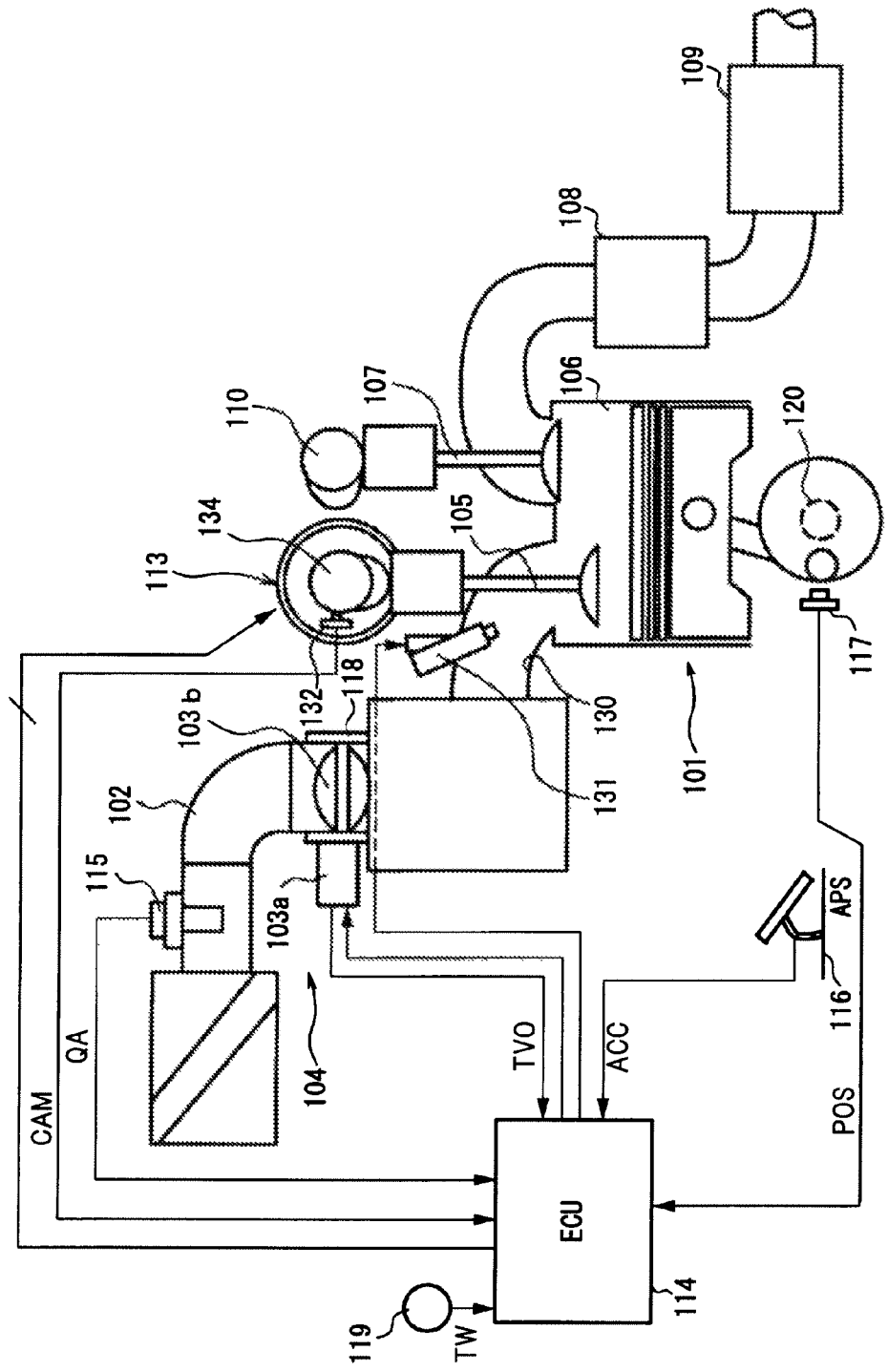
FIG. 1 is a block diagram illustrating an engine according to an embodiment of the present invention.

FIG. 1 is a block diagram of a four-cylinder gasoline engine.

In FIG. 1, in an intake pipe 102 of an engine 101, an electronically controlled throttle 104 for driving opening or closing of a throttle valve 103b by the use of a throttle motor 103a is disposed.

Then, an introduction of air by suction into a combustion chamber 106 is carried out via electronically controlled throttle 104 and an intake valve 105.

An electromagnetic fuel injection valve 131 is disposed at an intake port 130 of each cylinder.

Fuel injection valve 131 is driven to open based on an injection pulse signal from an ECU (engine control unit) 114, to inject fuel regulated at a predetermined pressure toward intake valve 105.

The fuel introduce by suction into combustion chamber 106 is combusted by spark-ignition conducted by an ignition plug (not shown in the figure).

The gas having combusted in combustion chamber 106 is exhausted from this combustion chamber to an exhaust pipe via an exhaust valve 107 and thereafter, is purified by a front catalytic converter 108 and a rear catalytic converter 109 to be discharged into the atmosphere.

Intake valve 105 and exhaust valve 107 are driven in order to open or close by cams disposed on an intake camshaft 134 and an exhaust camshaft 110. On intake camshaft 134, a variable valve timing mechanism (VTC) 113 is disposed.

Further, variable valve timing mechanism 113 is a mechanism which changes a rotating phase of intake camshaft 134 relative to a crankshaft 120 to vary valve timing of intake valve 105.

Figure 2:
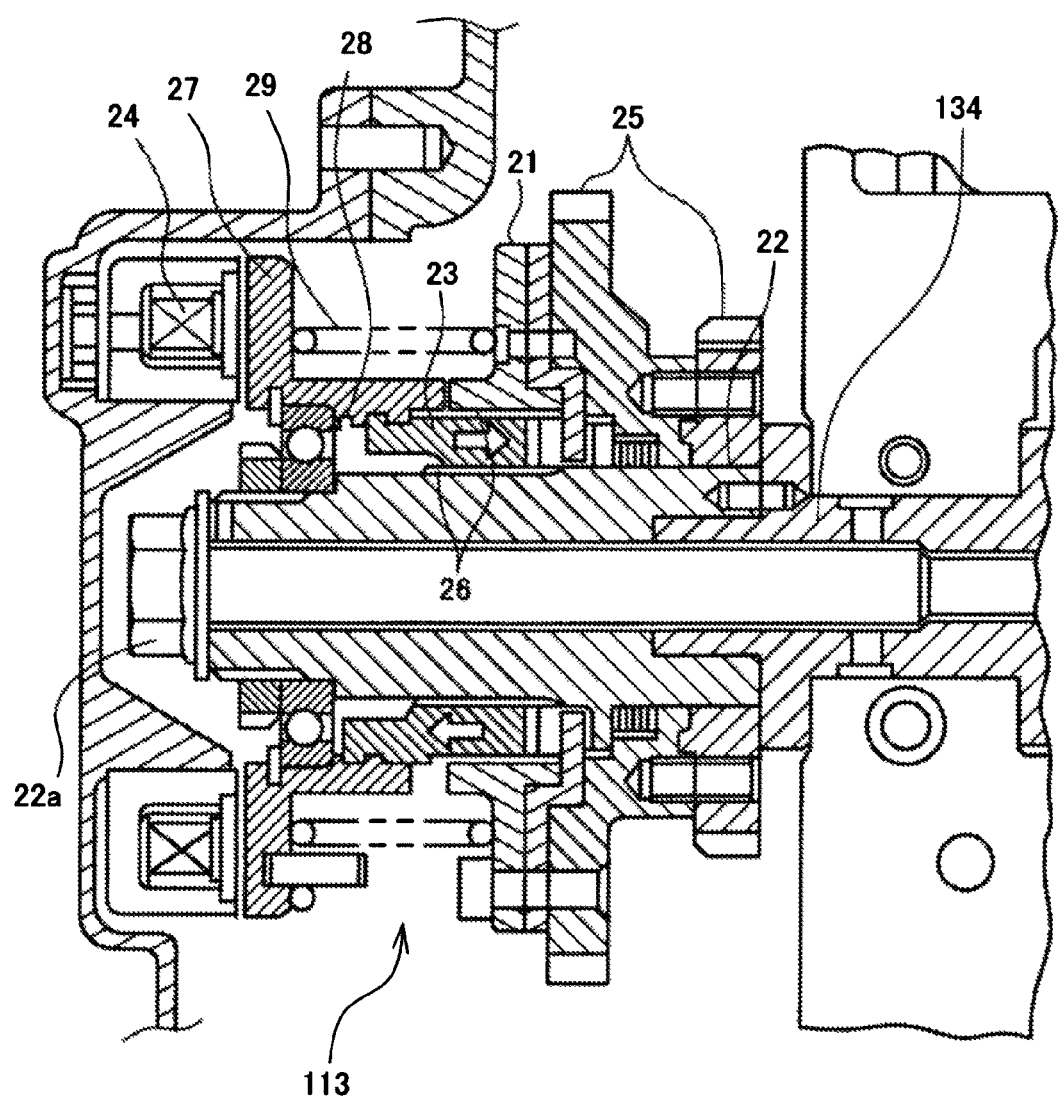
FIG. 2 is a cross section view illustrating a variable valve timing mechanism according to the embodiment of the present invention.

FIG. 2 shows a structure of variable valve timing mechanism 113.

Variable valve timing mechanism 113 is fixed to a sprocket 25 which is rotated in synchronism with crankshaft 120, and includes: a first rotator 21 which is rotated integrally with sprocket 25; a second rotator 22 which is fixed to one end of intake camshaft 134 by means of a bolt 22a, to be rotated integrally with intake camshaft 134; and an intermediate gear 23 of cylindrical shape which is engaged with an inner peripheral face of first rotator 21 and with an outer peripheral face of second rotator 22, by means of helical splines 26.

A drum 27 is connected to intermediate gear 23 via a triple thread screw 28. Between drum 27 and intermediate gear 23, a torsion spring 29 is disposed.

Intermediate gear 23 is urged to a retarded angle direction (left direction in FIG. 2) by torsion spring 29, and when a voltage is applied to an electromagnetic retarder 24 to thereby generate a magnetic force, intermediate gear 23 is moved to an advance angle direction (right direction in FIG. 2), via drum 27 and triple thread screw 28.

A relative phase between rotators 21 and 22 is varied according to an axial position of intermediate gear 23, so that the phase of intake camshaft 134 relative to crankshaft 120 is changed.

Electromagnetic retarder 24 is controlled to be driven according to engine operating conditions based on control signals from ECU 114.

Incidentally, variable valve timing mechanism 113 is not limited to that having the structure shown in FIG. 2 and it is possible to apply a known variable valve timing mechanism which varies a rotating phase of a camshaft relative to a crankshaft.

It is possible to apply, for example, a variable valve timing mechanism provided with a movable portion which is guided in displaceable by a spiral guide, as disclosed in Japanese Laid-open (Kokai) Patent Application Publication No. 2003-184516, a hydraulic vane type variable valve timing mechanism as disclosed in Japanese Laid-open (Kokai) Patent Application Publication No. 2007-120406, or a motor type variable valve timing mechanism which drives a camshaft by a motor, as disclosed in Japanese Laid-open (Kokai) Patent Application Publication No. 2008-025541.

ECU 114 which incorporates therein a microcomputer, performs computing processes based on detection signals from various sensors to control electronically controlled throttle 104, variable valve timing mechanisms 113, fuel injection valve 131 and the like.

As various sensors, there are disposed an accelerator opening sensor 116 for detecting an accelerator opening ACC, an air flow meter 115 for detecting an intake air amount QA of engine 101, a crank angle sensor 117 for detecting a crank angle, a throttle sensor 118 for detecting an opening TVO of throttle valve 103b, a water temperature sensor 119 for detecting the cooling water temperature TW of engine 101 and a cam angle sensor 132 for detecting a cam angle.

Figure 3:
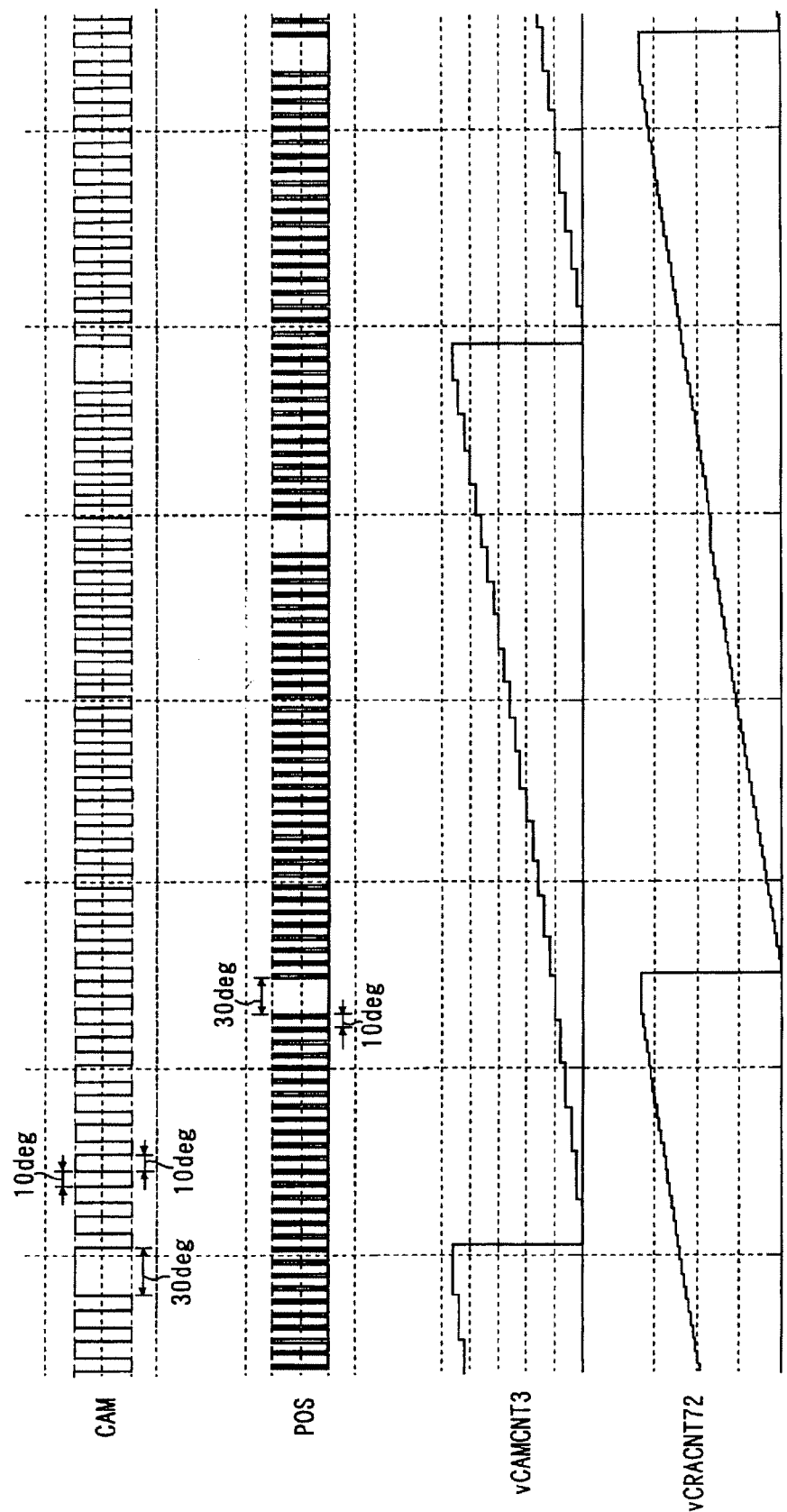
FIG. 3 is a timing chart illustrating characteristics of various signals according to the embodiment of the present invention.

Crank angle sensor 117 detects portions for detection, i.e., detected portions of a signal plate co-axially supported on crankshaft 120, to output crank angle signals POS each of which has trailing edge at each crank angle of 10 deg, which is a unit angle, as shown in FIG. 3. A cycle of appearance of respective trailing edges of crank angle signal POS is set at 30 deg different from the unit angle on one portion per one complete rotation of crankshaft 120.

Namely, crank angle sensor 117 is a sensor for detecting the rotation of crankshaft 120 in crank angle of 10 deg basis, and the portion at which an output cycle of crank angle signal POS is set at crank angle of 30 deg is detected at a fixed crank angle position. Therefore, by discriminating the portion at which the output cycle is set at crank angle of 30 deg, a rotation angle of crankshaft 120 can be detected as an angle from the angle position at which the output cycle of crank angle signal POS is set at crank angle of 30 deg.

The portion at which the output cycle of the crank angle signal POS is set at crank angle of 30 deg is set, for example, by consecutively eliminating two portions for being detected of crank angle sensor 117.

Incidentally, the ignition of four-cylinder engine 101 in the present embodiment is performed in order of #1 cylinder→#3 cylinder→#4 cylinder→#2 cylinder, and a stroke phase difference among the cylinders (ignition interval) is crank angle of 180 deg, so that the ignition is performed at 180 deg intervals.

Intake camshaft 134 performs ½ rotation per one complete rotation of crankshaft 120, and cam angle sensor 132 detects the portions for being detected of the signal plate axially supported on intake camshaft 134, to output cam angle signals CAM each having a leading/trailing edge at each crank angle of 10 deg (cam angle of 5 deg) which is the unit angle, as shown in FIG. 3. An edge cycle from one leading to trailing edge is set at crank angle of 30 deg (cam angle of 15 deg) different from the unit angle, on one portion per one rotation of intake camshaft 134.

Namely, cam angle sensor 132 is a sensor for detecting the rotation of camshaft 134 in cam angle of 5 deg basis, and the portion at which an output cycle of cam angle signal CAM is set at crank angle of 30 deg is detected on a fixed cam angle position. Therefore, by discriminating the portion at which the output cycle of cam angle signal CAM is set at crank angle of 30 deg, a rotation angle of camshaft 134 can be detected as an angle from the angle position at which the output cycle of cam angle signal CAM is set at crank angle of 30 deg.

Here, the portion (a reference crank angle position) at which the trailing cycle of the crank angle signal POS is 30 deg appears twice between the portions (reference cam angle positions) each at which the cycle from leading to trailing of cam angle signal CAM is 30 deg.

The portion at which the cycle from leading to trailing of cam angle signal CAM is crank angle of 30 deg is set, for example, by disposing a portion for being detected of which width in a circumferential direction is three times of those of other portions for being detected, as the portion for being detected by crank angle sensor 117.

Incidentally, the unit angle can be appropriately set according to the resolution required for detecting the rotating phase. However, it is preferable to set the unit angle at a minimum crank angle of about 5 to 20 deg.

ECU 114 detects the rotating phase of intake camshaft 134 relative to crankshaft 120 based on the detection signals from crank angle sensor 117 and cam angle sensor 132, to feedback control a manipulated variable for variable valve timing mechanism 113 (electromagnetic retarder 24) based on the difference between the detection result of the rotating phase and a target rotating phase.

Hereunder, there will be described the details of the rotating phase detection executed by ECU 114.

Figure 4:
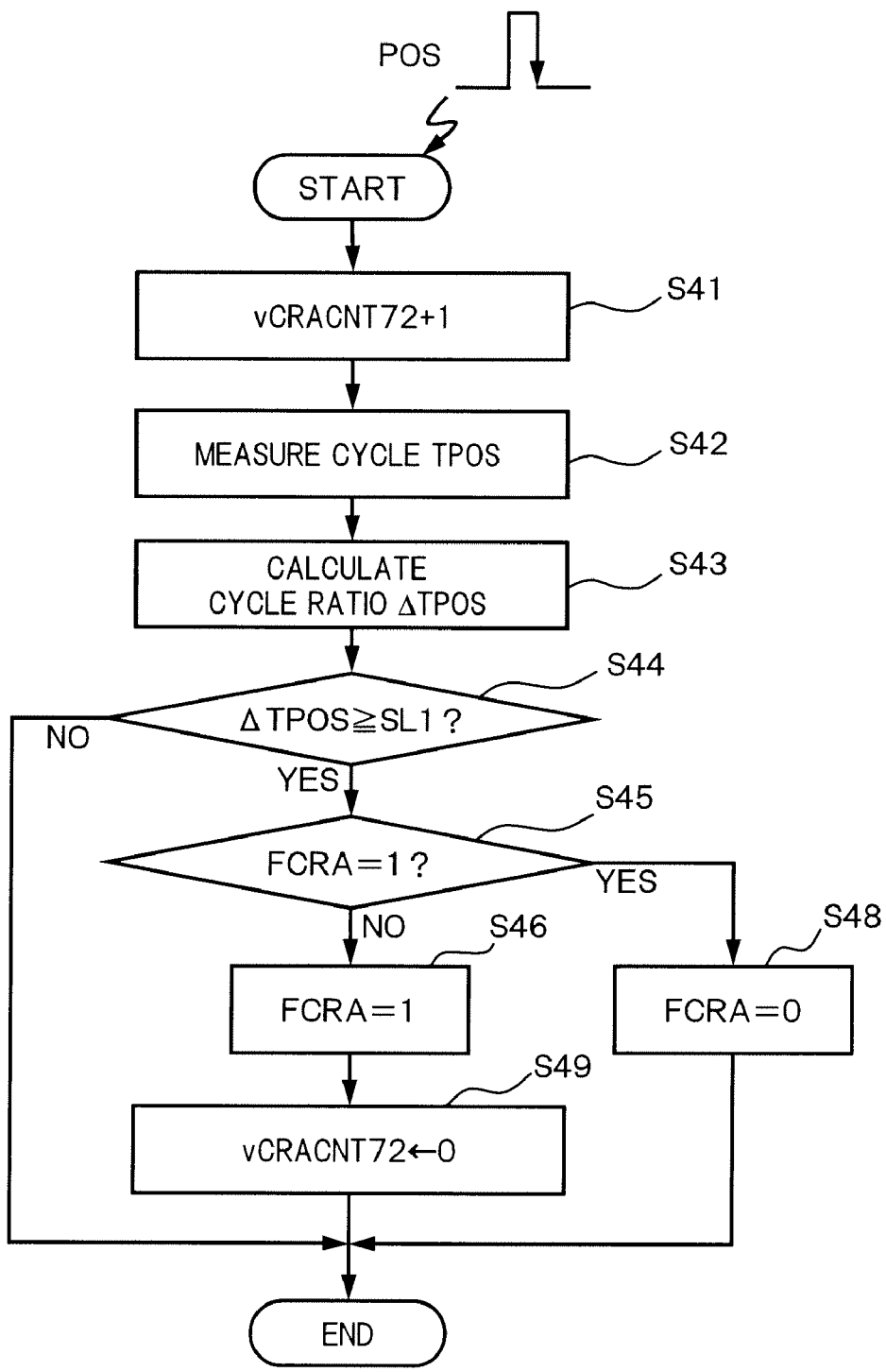
FIG. 4 is a flowchart illustrating a counting process of a crank angle signal POS according to the embodiment of the present invention.

A flowchart of FIG. 4 is executed at each trailing of crank angle signal POS (at each crank angle of 10 deg). In step S41, a counter vCRACNT72 for counting the trailing frequencies of crank angle signal POS is counted up by 1.

In next step S42, a trailing cycle TPOS of crank angle signal POS is measured based on a time difference between the previous execution of this routine and the present execution thereof.

In step S43, a cycle ratio ΔTPOS which is a ratio between the latest value of the trailing cycle TPOS and a previous value thereof is calculated.

Cycle ratio Δ*TPOS*=latest value/previous value

In step S44, it is judged whether or not the cycle ratio ΔTPOS is equal to or larger than a previously stored threshold SL1, so that it is judged whether or not the trailing cycle TPOS measured at present time is a measurement result of the cyclic portion of 30 deg.

If the cycle ratio ΔTPOS is equal to or larger the threshold SL1, it is judged that the present crank angle signal POS corresponds to the reference crank angle position, and the routine proceeds to step S45.

In step S45, it is judged whether or not a flag FCRA is 1.

If the flag FCRA is 0, the flag FCRA is set at 1 in step S46, and thereafter, the routine proceeds to step S47 where counter vCRACNT72 is reset to 0.

On the other hand, if the flag FCRA is 1, the routine proceeds to step S48 where the flag FCRA is reset to 0, and thereafter, the routine bypasses step S47 to be terminated.

Namely, if counter vCRACNT72 is reset to 0 as a result that the 30 deg cycle portion is detected at present time, it is not reset to 0 when the 30 deg cycle portion is detected at next time, and is again reset to 0 at second detection timing of the 30 deg cycle portion after the next detection. Therefore, as shown in FIG. 3, counter vCRACNT72 is reset to 0 for 2-for-1 30 deg cyclic portions, in other words, at each two rotations of crankshaft 120.

Figure 5:
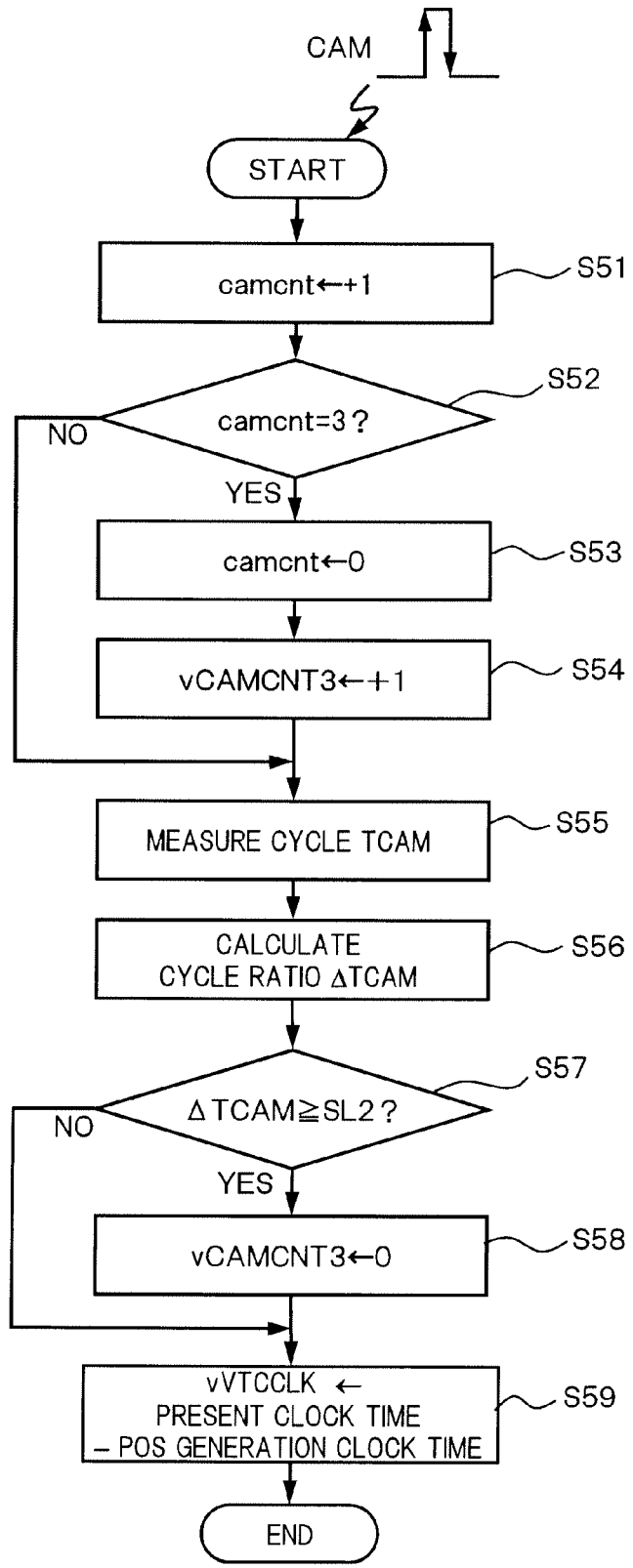
FIG. 5 is a flowchart illustrating a counting process of a cam angle signal CAM according to the embodiment of the present invention.

A flowchart of FIG. 5 is executed at each rising/trailing edge of cam angle signal CAM (each crank angle of 10 deg). In step S51, a counter CAMCNT for counting the rising/trailing edges of cam angle signal CAM is counted up by 1.

In next step S52, it is judged whether or not counter CAM-CNT is counted up to 3.

Then, if counter CAMCNT is counted up to 3, the routine proceeds to step S53 where counter CAMCNT is reset to 0, and in next step S54, a counter vCAMCNT3 is counted up by 1.

Namely, counter vCAMCNT3 is a counter counted up at each three rising/trailing edges of cam angle signal CAM.

In step S55, a rising/trailing edge cycle TCAM of cam angle signal CAM is measured based on a time difference between the previous execution of the this routine and the present execution thereof.

In step S56, a cycle ratio ΔTCAM which is a ratio between the latest value of the cycle TCAM and a previous value thereof is calculated.

Cycle ratio ΔTCAM=latest value/previous value

In step S57, it is judged whether or not the cycle ratio ΔTCAM is equal to or larger than a previously stored threshold SL2, so that it is judged whether or not the cycle TCAM measured at present time is a measurement result of the cycle portion at crank angle of 30 deg.

Incidentally, since both of the cycle TPOS and the cycle TCAM correspond to crank angle of 10 deg and the different cycle portions are all set to crank angle of 30 deg, the threshold SL1 may have a value same as that of the threshold SL2.

If the cycle ratio ΔTCAM is equal to or larger than the threshold SL2, it is judged that the present cam angle signal CAM corresponds to the reference cam angle position, and the routine proceeds to step S58.

In step S58, counter vCAMCNT3 is reset to 0.

Accordingly, counter vCAMCNT3 is reset to 0 at the reference cam angle position detected at each one rotation of intake camshaft 134, as shown in FIG. 3.

In step S59, a difference vVTCCLK between a present clock time and a clock time when the crank angle signal POS to be separately detected is generated, that is, a period of time from the trailing of crank angle signal POS until the detection of the rising/trailing edge of cam angle signal CAM, is calculated.

The above period of time indicates a phase difference between the crank angle signal POS and the cam angle signal CAM.

Figure 6:
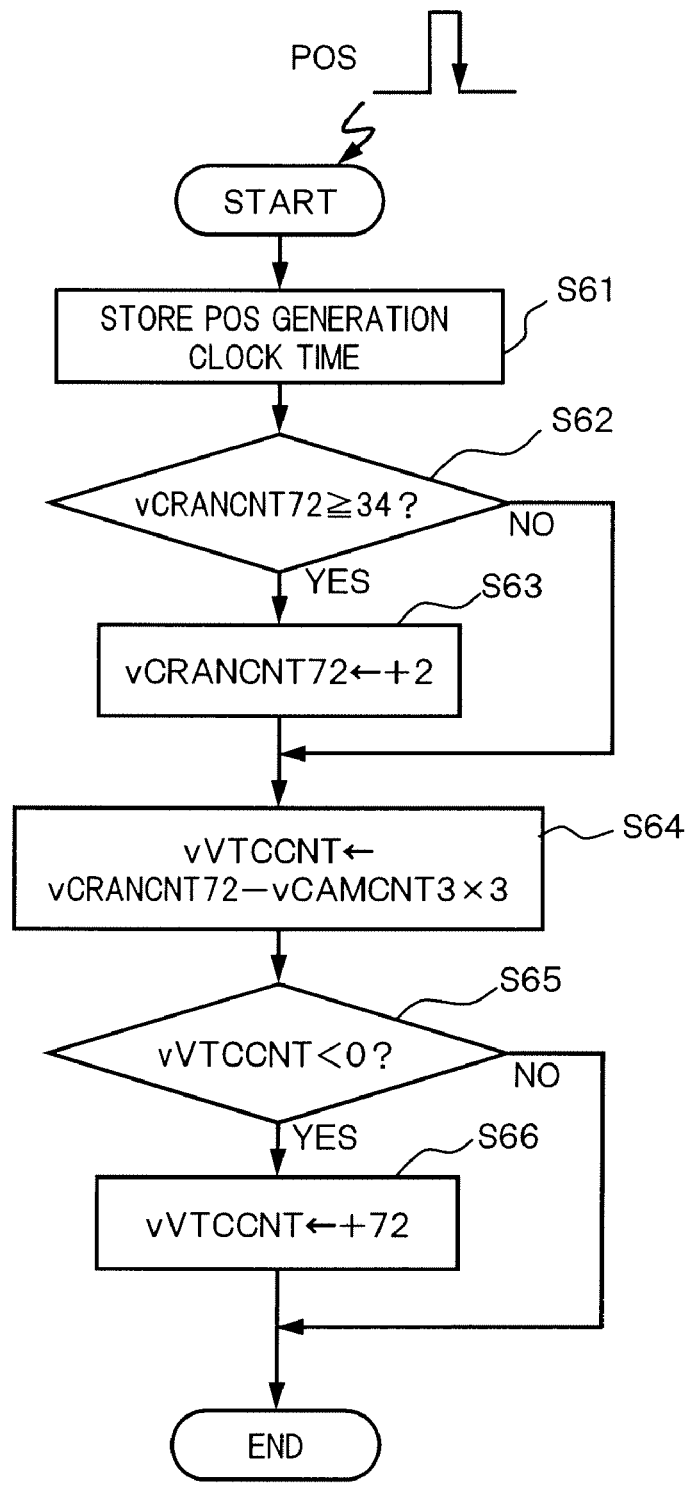
FIG. 6 is a flowchart illustrating a process of calculating a phase difference between a reference crank angle position and a reference cam angle position according to the embodiment of the present invention.

A flowchart of FIG. 6 is executed at each trailing of crank angle signal POS (at each crank angle of 10 deg).

In step S61, a clock time when the trailing of crank angle signal POS is detected, which is used for the computation in step S59, is stored.

In step S62, it is judged whether or not a value of counter vCRACNT72 is equal to or larger than 34, so that it is judged whether or not the 30 deg cycle portion at which counter vCRACNT72 is not reset to 0 has passed over.

Then, if the value of counter vCRACNT72 is equal to or larger than 34, counter vCRACNT72 is added with 2 in order to cover two crank angle signals POS which are not output at the 30 deg cyclic portion.

As a result, the value of counter vCRACNT72 correctly indicates the rotation angle from the reference crank angle position (30 deg cycle portion).

In step S64, the difference vVTCCNT between the value of counter vCRACNT72 and the number obtained by tripling a value of counter vCAMCNT3 is calculated.

vVTCCNT=vCRACNT72−vCAMCNT3×3

The triplication of the value of counter vCAMCNT3 is for making counters vCRACNT72 and vCAMCNT3 to have the same counted values at each 10 deg, since counter vCRACNT72 is counted up at each crank angle of 10 deg while counter vCAMCNT3 being counted up at each crank angle of 30 deg.

The difference vVTCCNT indicates the crank angle of from the reference crank angle position to the reference cam angle position, with crank angle of 10 deg as a unit.

In step S65, it is judged whether or not the difference vVTCCNT is a negative value.

Then, if the difference vVTCCNT is the negative value, the routine proceeds to step S66 where 72 is added to the difference vVTCCNT, so that the difference vVTCCNT expresses the crank angle of from the reference crank angle position to the reference cam angle position.

Figure 7:
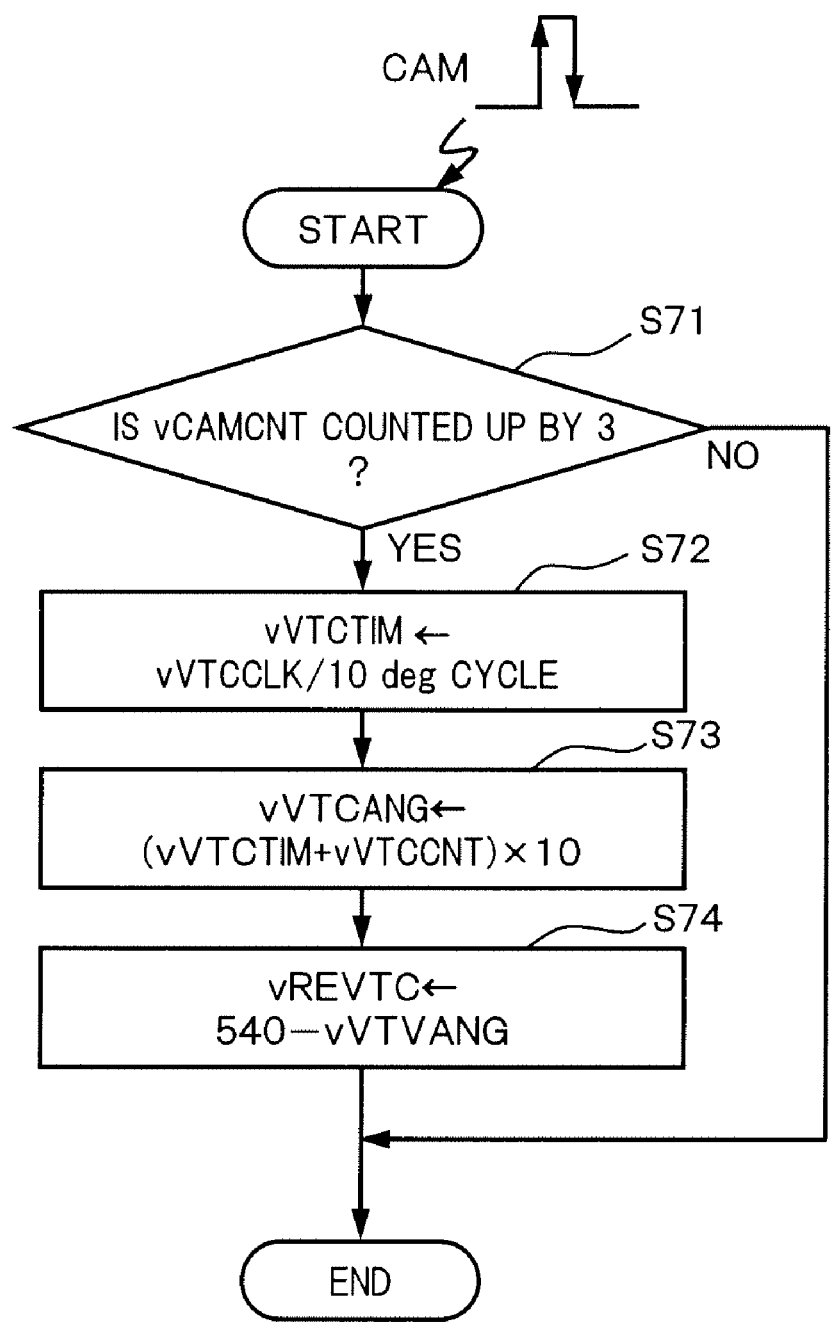
FIG. 7 is a flowchart illustrating a process of calculating a rotating phase of a camshaft according to the embodiment of the present invention.

A flowchart of FIG. 7 is executed at each rising/trailing edge of cam angle signal CAM (at each crank angle of 10 deg).

In step S71, it is judged whether or not it is timing for counting up counter vCAMCNT3. Then, only when it is timing for counting up counter vCAMCNT3, processes of step S72 and the subsequent steps are executed. Namely, the processes of step S72 and the subsequent steps are executed at each crank angle of 30 deg.

In step S72, a phase difference vVTCCLK between the trailing edge of crank angle signal POS and the rising/trailing edge of cam angle signal CAM is divided by the cycle TPOS of crank angle signal POS, to obtain how many 10 deg cycles to which the phase difference vVTCCLK corresponds.

vVTCTIM=vVTCCLK/TPOS

In step S73, a crank angle vVTCANG from the reference crank angle position to the reference cam angle position is calculated based on vVTCTIM and vVTCCNT.

vVTCANG=(vVTCTIM+vVTCCNT)×10

Further, in next step S74, the actually calculated angle vVTCANG is subtracted from 540 deg which is data of the angle vVTCANG in the case where the rotating phase of intake camshaft 134 is controlled to the most retarded angle by variable valve timing mechanism 113, to calculate an advance angle amount vREVTC of the rotating phase.

As described in the above, the advance angle amount vREVTC of the rotating phase is detected at each crank angle of 30 deg, and the manipulated variable for variable valve timing mechanism 113 is feedback controlled so that the advance angle amount vREVTC approaches a target advance angle set based on the engine operating conditions.

Accordingly, even when the engine rotation is low, it is possible to detect the rotating phase in a sufficiently short time cycle, so that the manipulated variable for variable valve timing mechanism 113 can be feedback controlled at a high speed with high precision.

The reason why the detecting cycle of the rotating phase is set at crank angle of 30 deg is that, since the value of counter vCRACNT72 is not counted up at each 10 deg in the 30 deg cycle portion, if the rotation cycle is set to be detected at each 10 deg, an advance angle amount largely different from the actual advance angle amount might be calculated in the 30 deg cycle portion.

Incidentally, in the above embodiment, the unit angle is set at crank angle of 10 deg and the rotating phase is detected at each crank angle of 30 deg. However, it is apparent that the unit angle is not limited to such angle setting. Further, it is possible to set cam angle sensor 132 to generate cam angle signals CAM each of which trails or rises at each unit angle.

It is possible to discriminate a cylinder on a predetermined piston position at each stroke phase difference among the cylinders, based on the detection signals from crank angle sensor 117 and cam angle sensor 132, to use the cylinder discrimination result for a fuel injection control or an ignition timing control for each cylinder.

Hereunder, there will be described the details of cylinder discrimination by ECU 114.

Figure 8:
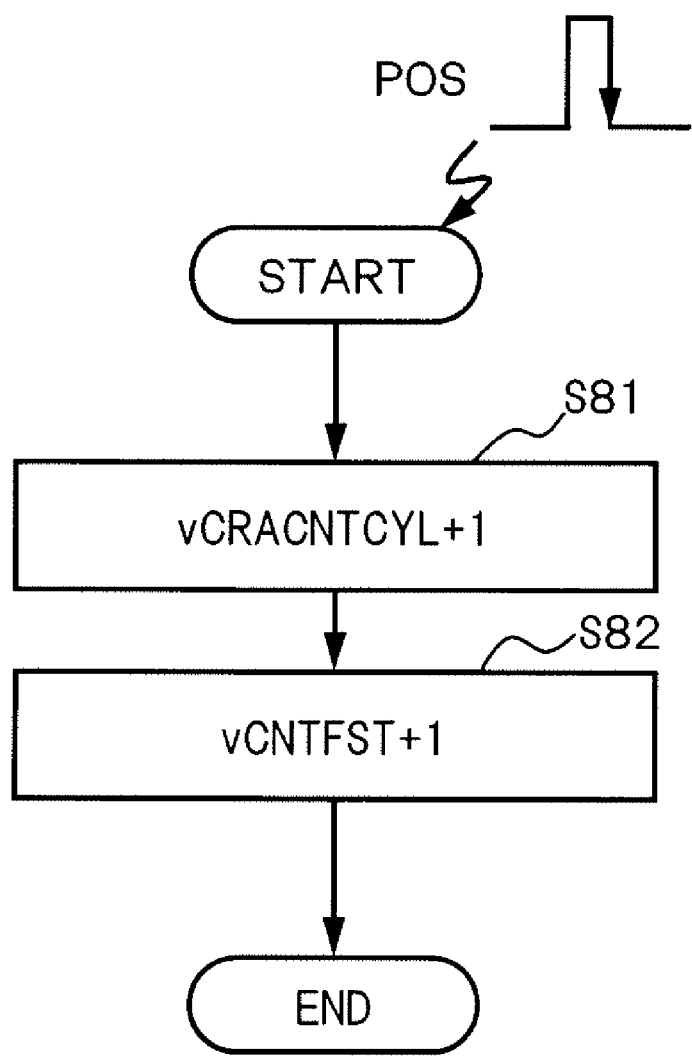
FIG. 8 is a flowchart illustrating the counting process of the crank angle signal POS according to the embodiment of the present invention.

A flowchart of FIG. 8 is executed at each timing of trailing edge of crank angle signal POS.

Figure 12:
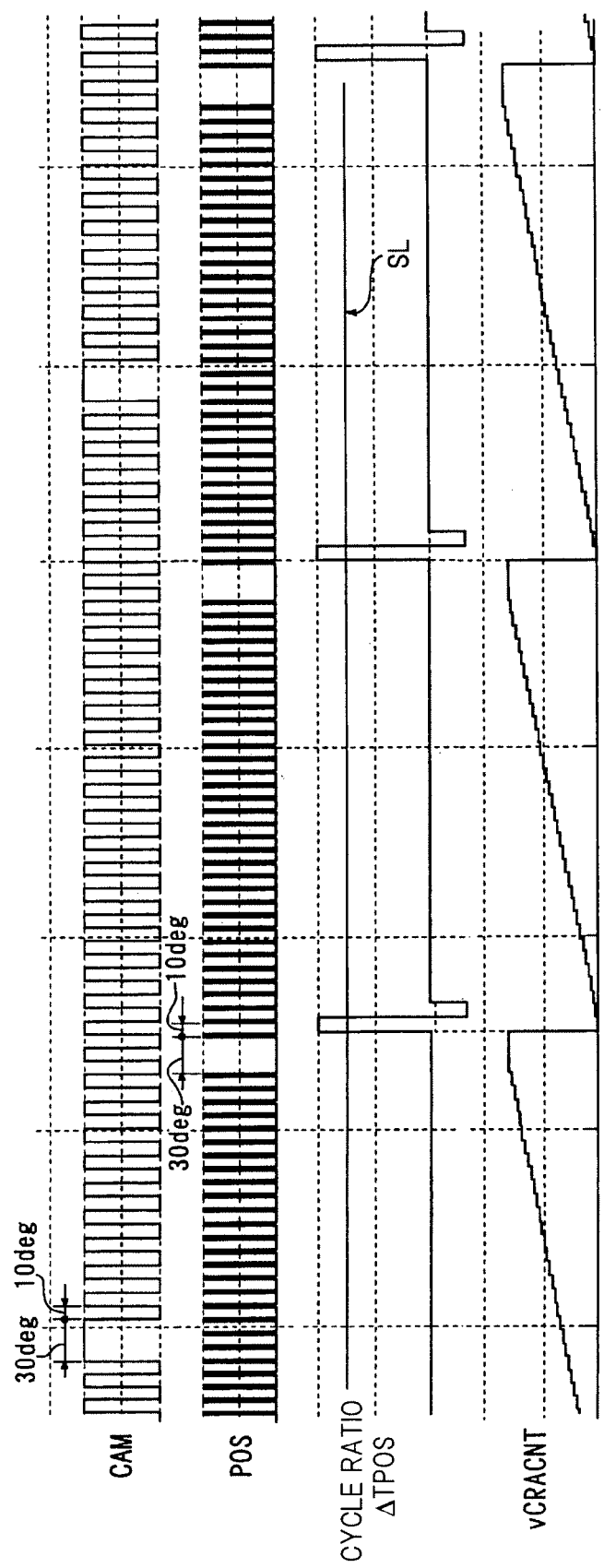
FIG. 12 is a timing chart illustrating the cam angle signal CAM, the crank angle signal POS and a counter vCRACNT-CYL according to the embodiment of the present invention.

In step S81, a counter vCRACNTCYL is counted up by 1 (refer to FIG. 12).

Figure 13:
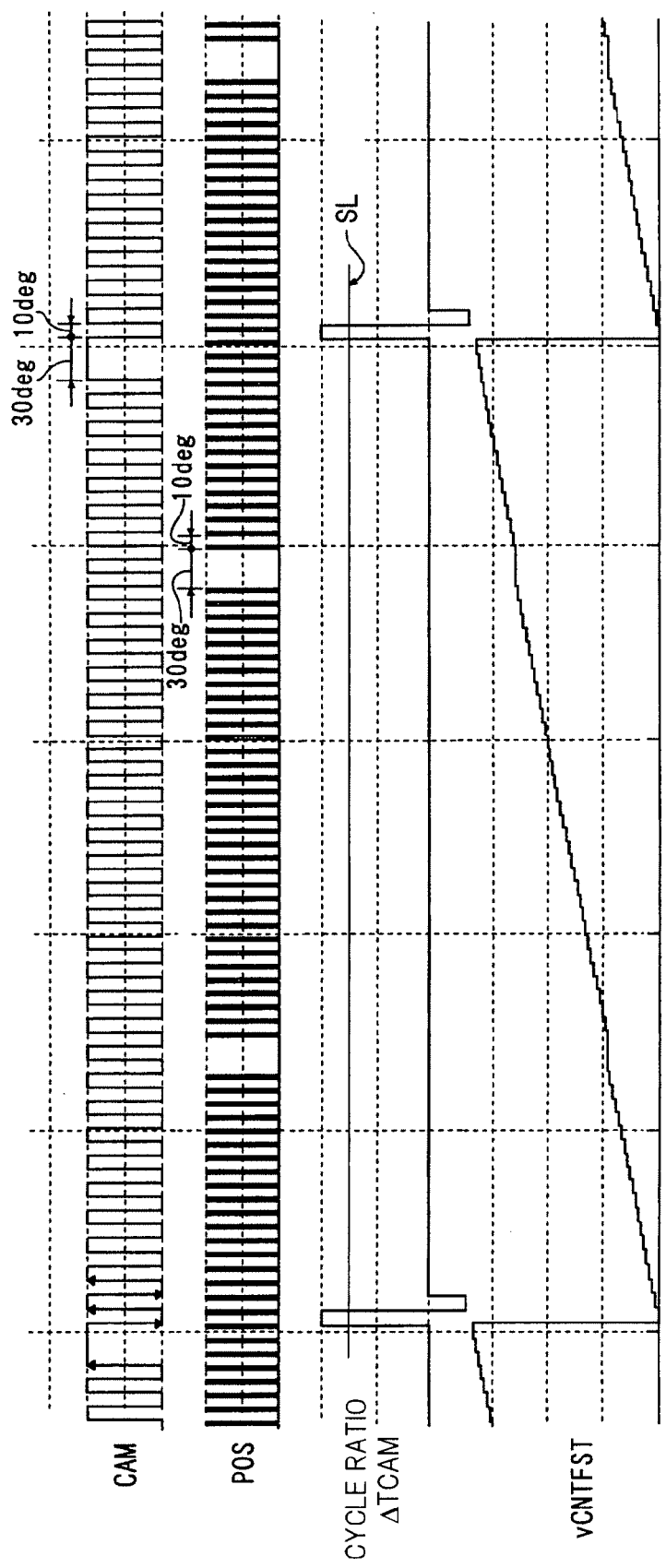
FIG. 13 is a timing chart illustrating the cam angle signal CAM, the crank angle signal POS and a counter vCNTFST according to the embodiment of the present invention.

In next step S82, a counter vCNTFST is counted up by 1 (refer to FIG. 13).

Figure 9:
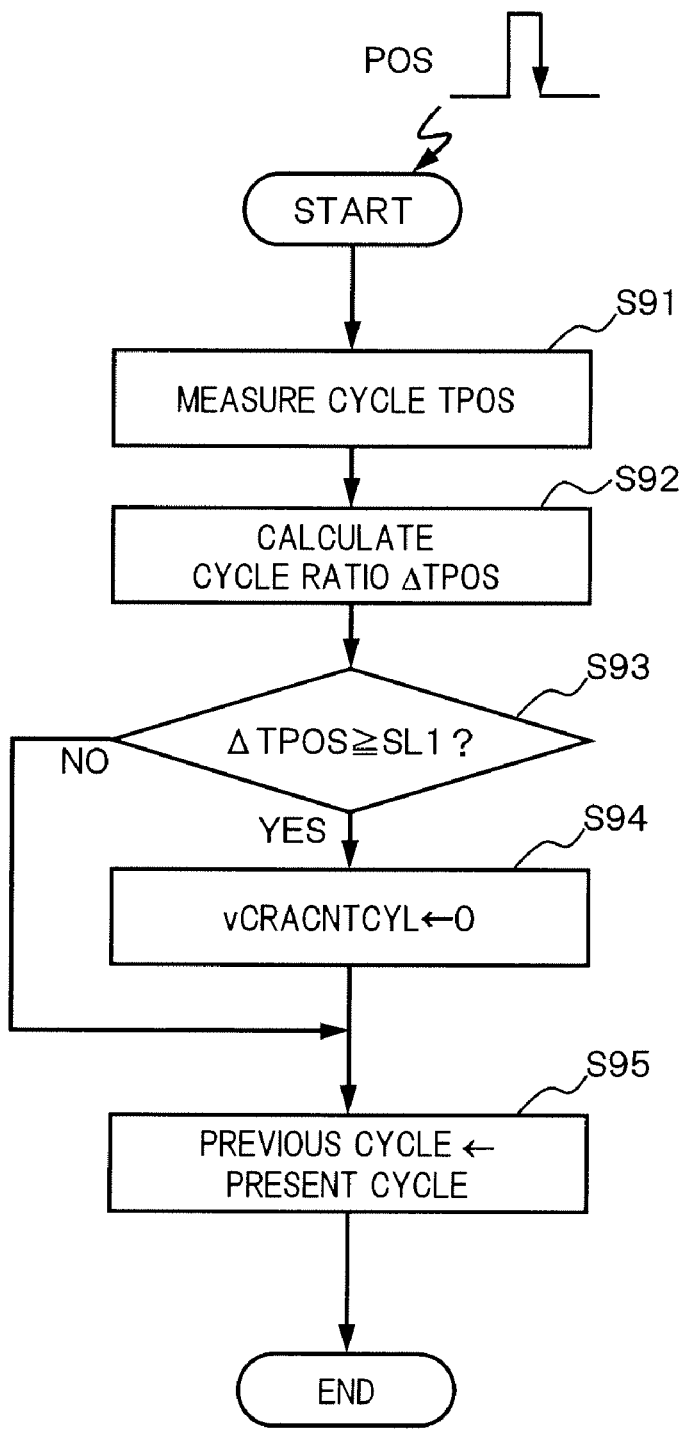
FIG. 9 is a flowchart illustrating a detecting process of the reference crank angle position according to the embodiment of the present invention.

A flowchart of FIG. 9 is executed at each trailing of crank angle signal POS.

In step S91, a time interval between the previous execution of this routine and the present execution thereof is set at the latest value of the trailing cycle TPOS (time cycle) of crank angle signal POS.

In step S92, the ratio ΔTPOS between the latest value of the cycle TPOS and the previous value thereof is calculated.

Cycle ratio Δ*TPOS*=latest value/previous value

In step S93, it is judged whether or not the cycle ratio ΔTPOS exceeds the previously stored threshold SL1.

The threshold SL1 is set at a value over which the cycle ratio ΔTPOS exceeds, in the case where the present value is the detection result of the trailing cycle of 30 deg.

Here, if the cycle ratio ΔTPOS exceeds the threshold SL1, it is judged that the crank angle is on the reference crank angle position, and the routine proceeds to step S94 where counter vCRACNTCYL is reset to 0.

Namely, as shown in FIG. 12, counter vCRACNTCYL is counted up at each trailing of crank angle signal POS and is reset to 0 when the crank angle signal POS indicates a trailing edge at 30 deg cycle (at each one rotation of crankshaft 120).

If the cycle ratio ΔTPOS does not exceeds the threshold SL1, it is judged that the present value is not the detection result of 30 deg trailing cycle, and the routine bypasses step S94 to proceed to step S95.

In step S95, the present value of the cycle TPOS of crank angle signal POS is set to the previous value.

Figure 10:
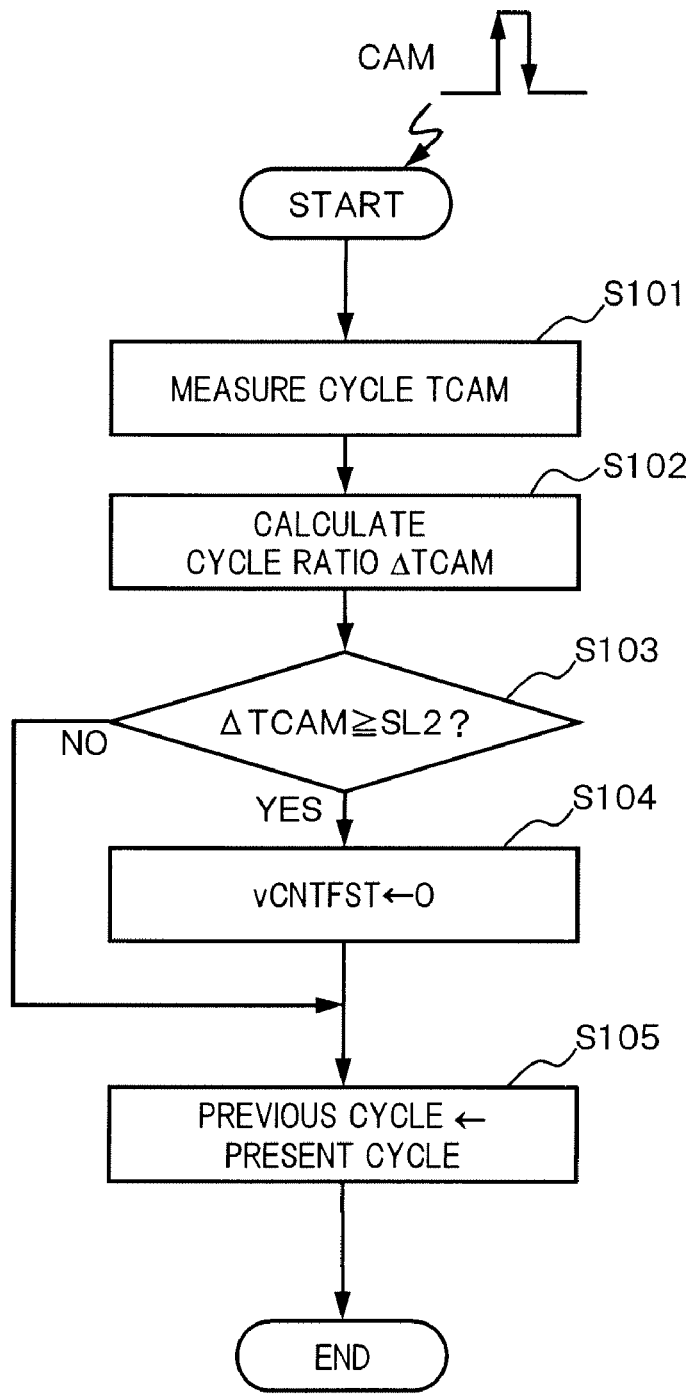
FIG. 10 is a flowchart illustrating a detecting process of the reference cam angle position according to the embodiment of the present invention.

A flowchart of FIG. 10 is executed at each leading/trailing edge of cam angle signal CAM.

In step S101, a time interval between the previous execution of this routine and the present execution thereof is set at the latest value of the leading/trailing cycle TCAM of cam angle signal CAM.

In step S102, the ratio ΔTCAM between the latest value of the cycle TCAM and the previous value thereof is calculated.

Cycle ratio Δ*TCAM*=latest value/previous value

In step S103, it is judged whether or not the cycle ratio ΔTCAM exceeds the previously stored threshold SL2.

The threshold SL2 is set at a value over which the cycle ratio ΔTCAM exceeds, in the case where the present value is the detection result of 30 deg leading/trailing cycle.

Here, if the cycle ratio ΔTCAM exceeds the threshold SL2, it is judged that the cam angle is on the reference cam angle position, and the routine proceeds to step S104 where counter vCNTFST is reset to 0.

Namely, as shown in FIG. 13, counter vCNTFST is counted up at each trailing of crank angle signal POS and is reset to 0 when the cam angle signal CAM trails in 30 deg cycle, that is, at each one rotation of camshaft 134 or at each two rotations of crankshaft 120.

If the cycle ratio ΔTCAM does not exceed the threshold SL2, it is judged that the present value is not the detection result of 30 deg leading/trailing cycle, and the routine bypasses step S104 to proceed to step S105.

In step S105, the latest value of the cycle TCAM of cam angle signal CAM is set at the previous value.

Figure 11:
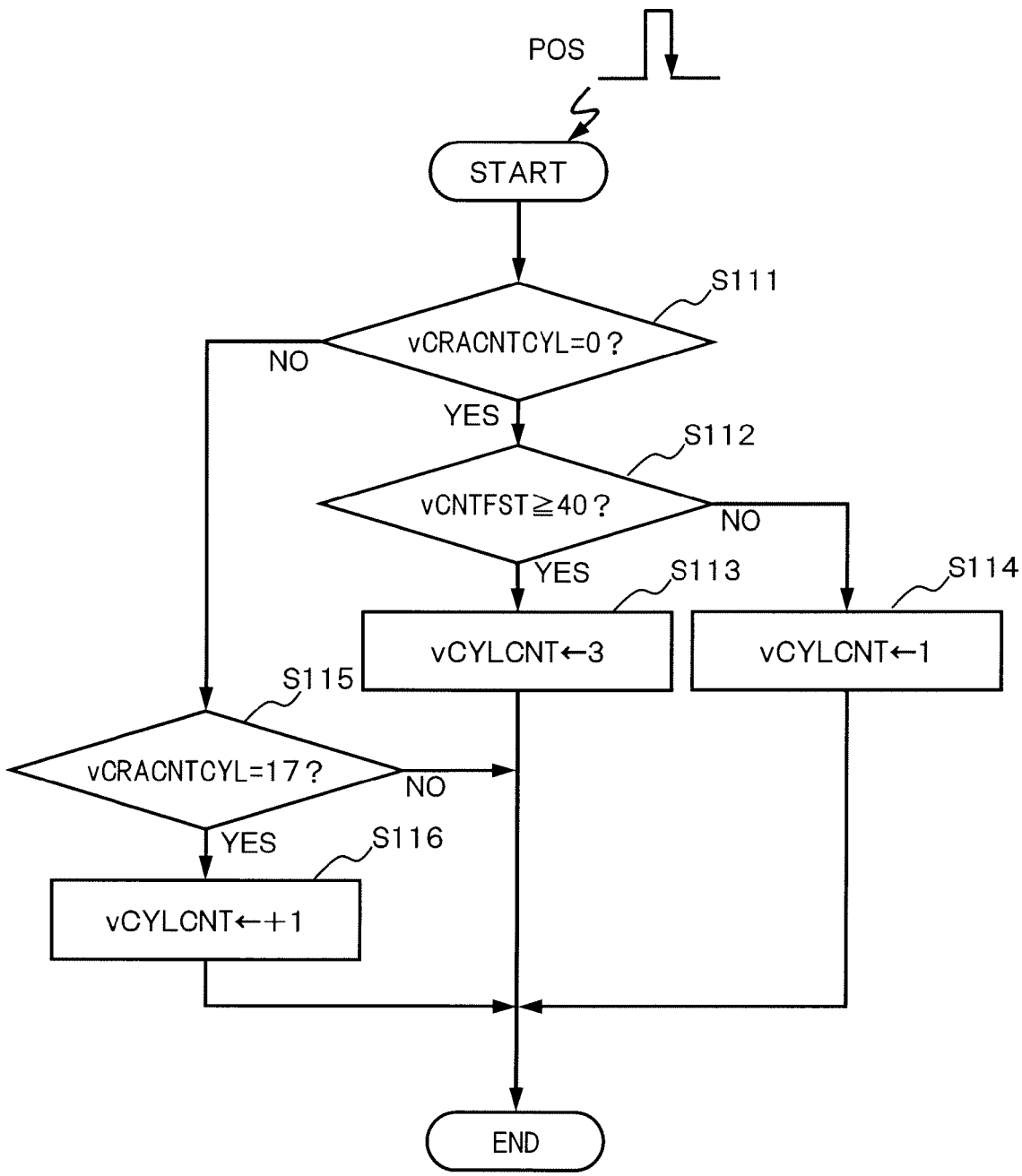
FIG. 11 is a flowchart illustrating a detecting process of a cylinder of which piston is positioned on the top dead center of an intake stroke, according to the embodiment of the present invention.

A flowchart of FIG. 11 is executed at each trailing of crank angle signal POS. In step S111, it is judged whether or not a value of counter vCRACNTCYL is 0.

If the value of counter vCRACNTCYL is 0, it is judged that it is cylinder discrimination timing, and the routine proceeds to step S112.

In step S112, it is judged whether or not a value of counter vCNTFST is equal to or larger than 40.

Then, if the value of counter vCNTFST is equal to or larger than 40, the routine proceeds to step S113 where 3 is set to a cylinder discrimination value vCYLCNT.

Incidentally, a numeral value to be set to the cylinder discrimination value vCYLCNT indicates the number of cylinder of which piston is positioned on a reference position.

On the other hand, if the value of counter vCNTFST is smaller than 40, the routine proceeds to step S114 where 1 is set to the cylinder discrimination value vCYLCNT.

An initial value of the cylinder discrimination value vCYLCNT is 0 which is held until 3 or 1 is set to the cylinder discrimination value vCYLCNT in step S113 or step S114, and vCYLCNT=0 indicates a cylinder indiscrimination state.

Further, if it is judged in step S101 that the value of counter vCRACNTCYL is not 0, the routine proceeds to step S105 where it is judged whether or not the value of counter vCRACNTCYL is 17.

Counter vCRACNTCYL=17 indicates an intermediate point until the value of counter vCRACNTCYL next reaches 0 from the previous 0, and also when counter vCRACNTCYL=17, it is judged that it is cylinder discrimination timing and the routine proceeds to step S116.

Since counter vCRACNTCYL is reset to 0 at each one rotation of crankshaft 120, timing of counter vCRACNTCYL=0 and counter vCRACNTCYL=17 is timing at each crank angle of 180 deg.

Then, crank angle of 180 deg corresponds to a stroke phase difference among the cylinders in four-cylinder engine 101 (ignition interval), and by performing the cylinder discrimination at each crank angle of 180 deg, the cylinder of which piston is positioned on the top dead center of the intake stroke, for example, is sequentially judged.

In step S116, the cylinder discrimination value vCYLCNT is set at "the previous value+1".

Figure 14:
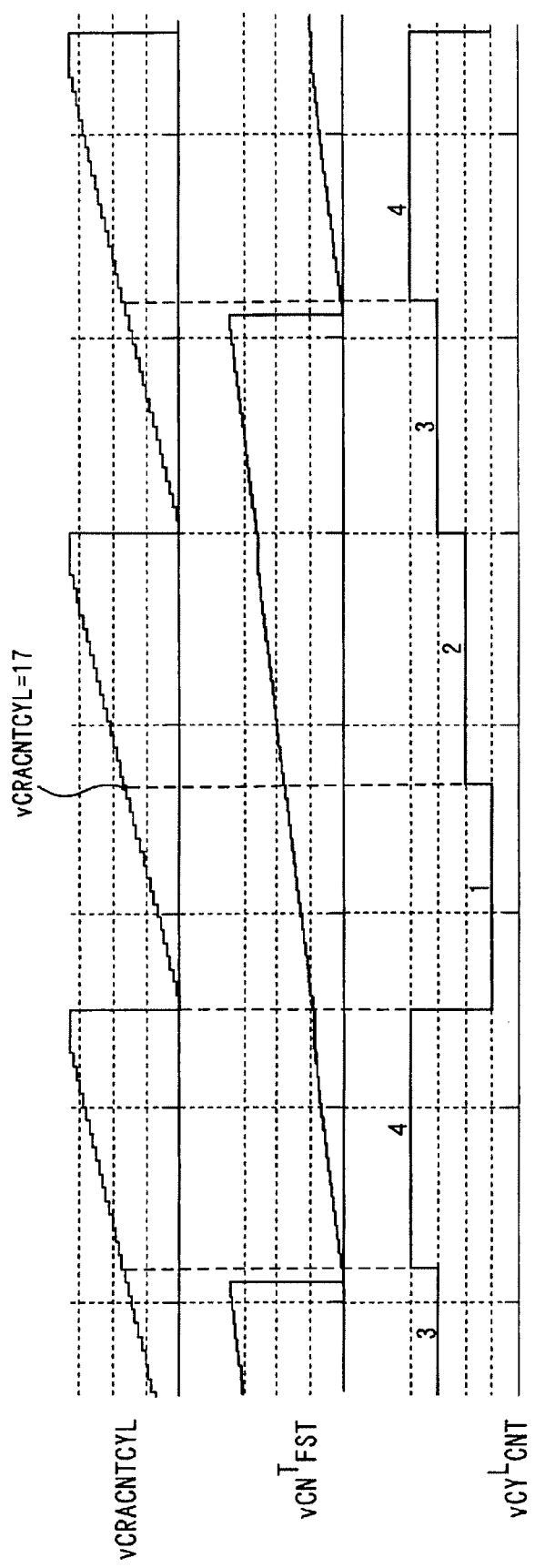
FIG. 14 is a timing chart illustrating the counter vCRACNTCYL, the counter vCNTFST and a cylinder discrimination value vCYLCNT according to the embodiment of the present invention.

Accordingly, the cylinder discrimination value vCYLCNT is set to 1 by judging that the value of counter vCNTFST is smaller than 40 when the value of counter vCRACNTCYL is 0, and next, is counted up by 1 to reach 2, when the value of counter vCRACNTCYL=17. Then, next, the cylinder discrimination value vCYLCNT is set to 3 by judging that the value of counter vCNTFST is equal to or larger than 40 when the value of counter CRACNTCYL is 0, and next, is counted up by 1 to reach 4, when the value of counter vCRACNTCYL=17. By repetitively executing the above process, the value of counter vCRACNTCYL repetitively returns to 1 and is counted up to 4 again (refer to FIG. 14).

Incidentally, the cylinder discrimination value vCYLCNT indicates what cylinder of #1 cylinder→#3 cylinder→#4 cylinder→#2 cylinder is next positioned on the top dead center of the intake stroke, and for example if vCYLCNT=3, it is indicated that #4 cylinder is next positioned on the intake TDC.

Since the value of counter vCRACNTCYL is reset to 0 for two times during the value of counter vCNTFST is reset to 0, even if counter vCRACNTCYL=0, the value of counter vCNTFST is different by a value equivalent to one rotation of crankshaft 120, depending on whether or not the timing of counter vCRACNTCYL=0 is immediately after counter VCNTFST is reset to 0.

Accordingly, by judging whether or not the value of counter vCNTFST is less than 40, it is possible to definitely discriminate the timing of counter vCRACNTCYL=0 as intake TDC timing of another cylinder, to thereby perform the cylinder discrimination with high precision.

Further, even when the value of counter vCNTFST for when counter vCRACNTCYL=0 is changed as a result that the rotating phase of camshaft 134 relative to crankshaft 120 is varied by variable valve timing mechanism 113, a change range of the value of counter vCNTFST is sufficiently small relative to the difference for one rotation of crankshaft 120, and therefore, such a change does not affect the cylinder discrimination.

Incidentally, above described cam angle sensor 132 is configured such that the output cycle of cam angle signal CAM is made longer at the reference cam angle position. However, it is possible to make the output cycle of cam angle signal CAM shorter at the reference cam angle position, to thereby detect the position where the output cycle of cam angle signal CAM is made shorter, as the reference cam angle position.

Figure 15:
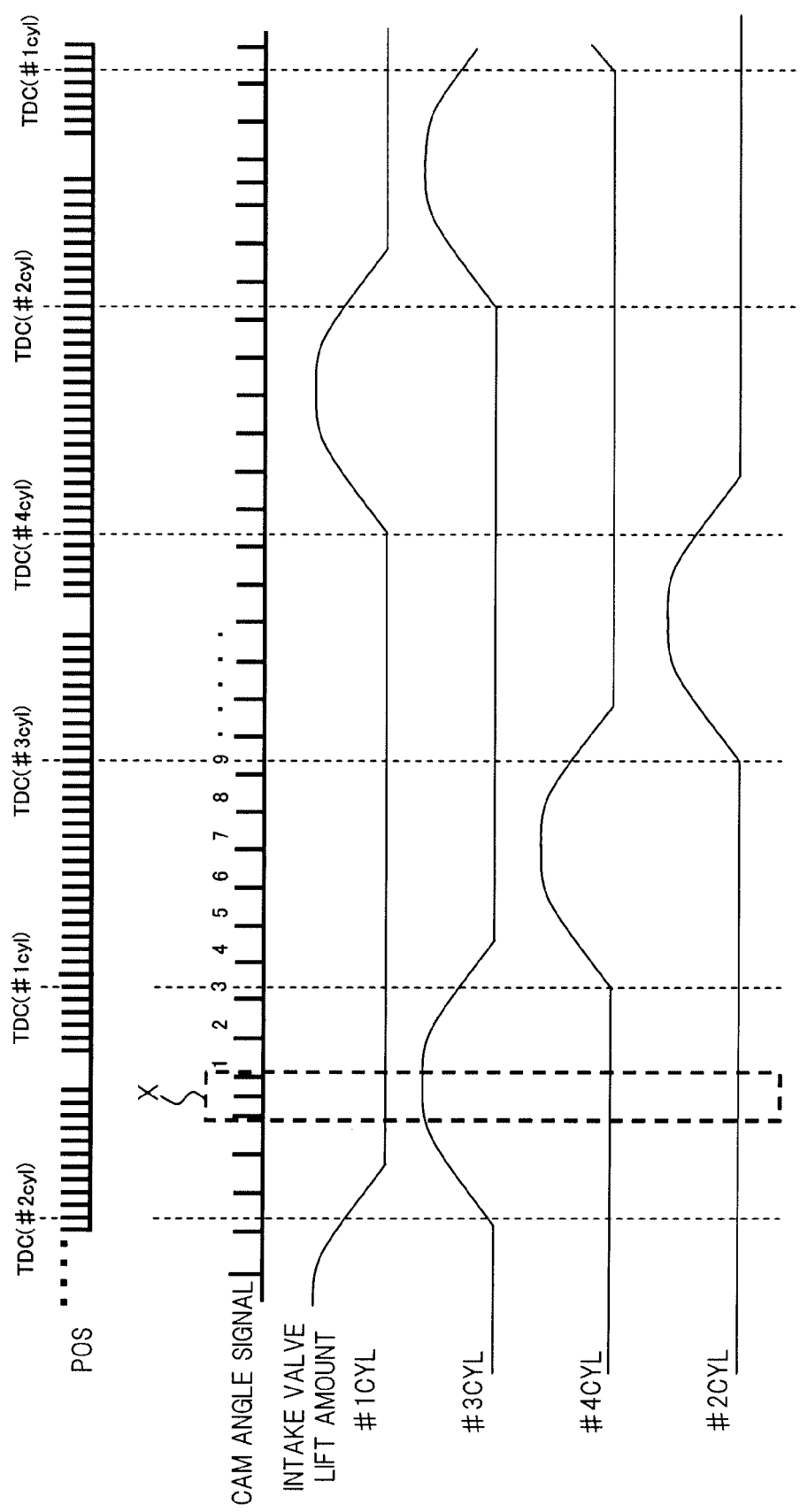
FIG. 15 is a timing chart illustrating an example of output pattern of the cam angle signal CAM according to the embodiment of the present invention.

FIG. 15 shows the correlation between the cam angle signal CAM of which output cycle is made shorter at the reference cam angle position and the crank angle signal POS.

The cam angle signal CAM shown in FIG. 15 is a pulse signal output at each crank angle of 30 deg, which is the unit angle, and there is disposed a portion X at which the cam angle signal CAM is output in 15 deg cycle for consecutive two times, on one portion per one rotation of intake camshaft 134.

Namely, the cam angle signal CAM is excessively output at an intermediate portion between the cam angle signal CAM output at the reference cam angle position and the next cam angle signal CAM output at 30 deg cycle, so that the output cycle of cam angle signal CAM is 15 deg for two consecutive times.

By judging the portion at which the output cycle of cam angle signal CAM is set at crank angle of 15 deg, it is possible to detect the reference cam angle position, to thereby detect the rotation angle of camshaft 134 from the reference cam angle position based on the generation number of cam angle signals CAM from the detected reference cam angle position.

Accordingly, even in the case of using cam angle sensor 132 outputting the cam angle signal CAM as shown in FIG. 15, it is possible to detect the rotating phase at each crank angle of 30 deg.

Here, the position at which the output cycle of cam angle signal CAM is made shorter is set to be within a section in which only intake valve 105 of one cylinder is opened, and also, a lift amount of intake valve 105 is increasingly varied. As a result, it is possible to prevent the reference cam angle position from being erroneously detected by an influence of the engine rotation speed variation due to a cam reaction force.

Figure 16:
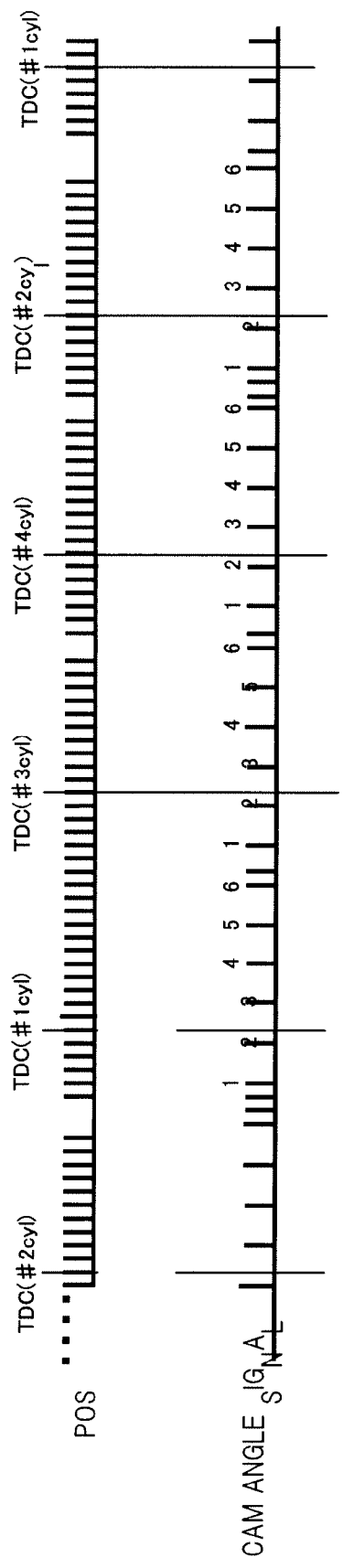
FIG. 16 is a timing chart illustrating an example of output pattern of the cam angle signal CAM according to the embodiment of the present invention.

Further, as shown in FIG. 16, it is possible to detect the reference cam angle position at each crank angle of 180 deg, by changing the cycle of cam angle signal CAM at each crank angle of 180 deg (at each cam angle of 90 deg).

In FIG. 16, excessive one or two cam angle signal CAM is output between the cam angle signal CAM output at the reference cam angle position per each crank angle of 180 deg and the next cam angle signal CAM output at 30 deg interval.

Here, in the portion at which two excessive cam angle signals CAM are output, the output cycle of cam angle signal CAM is crank angle of 10 deg for three consecutive times, whereas in the portion at which one excessive cam angle signal CAM is output, the cycle of crank angle of 10 deg and the cycle of crank angle of 20 deg are in succession.

Further, among four reference cam angle positions, one excessive cam angle signal CAM is output at each of the two reference cam angle positions whereas two excessive cam angle signals CAM are output at each of the remaining two reference cam angle positions, and also, two reference cam angle positions at each of which one excessive cam angle signal CAM is output are consecutively set.

Further, the crank angle signal POS shown in FIG. 16 is a pulse signal output at each crank angle of 10 deg, but is not output at each crank angle of 180 deg. Further, in two portions at each of which the crank angle signal POS is not output, one crank angle signal POS is not output in one of the two portions and two crank angle signals POS are not output in the other portion.

According to the combination of cam angle sensor 132 and crank angle sensor 117, the number of cam angle signals CAM excessively output at each crank angle of 180 deg is changed in order of two→one→one→two, whereas the number of crank angle signals POS which are not output is changed in order of two→one→two→one.

Therefore, it is possible to discriminate the two reference cam angle positions at each of which the number of cam angle signals CAM excessively output is two, depending on whether the number of crank angle signals POS which is not output at the corresponding position is one or two.

Accordingly, it is possible to discriminate the four reference cam angle positions based on combinations of the number of excessively output cam angle signals CAM with the number of crank angle signals POS which is not output, to thereby discriminate the cylinder on the reference piston position at the time at each crank angle of 180 deg.

Further, by judging the portion at which the output cycle of cam angle signal CAM is made shorter, it is possible to detect the reference cam angle position, to thereby detect the rotation angle of camshaft 134 from the reference cam angle position, based on the generation number of cam angle signals CAM from the detected reference cam angle position.

Consequently, even in the case of using cam angle sensor 132 outputting the cam angle signal CAM as shown in FIG. 16, it is possible to detect the rotating phase at each crank angle of 30 deg.

Figure 17:
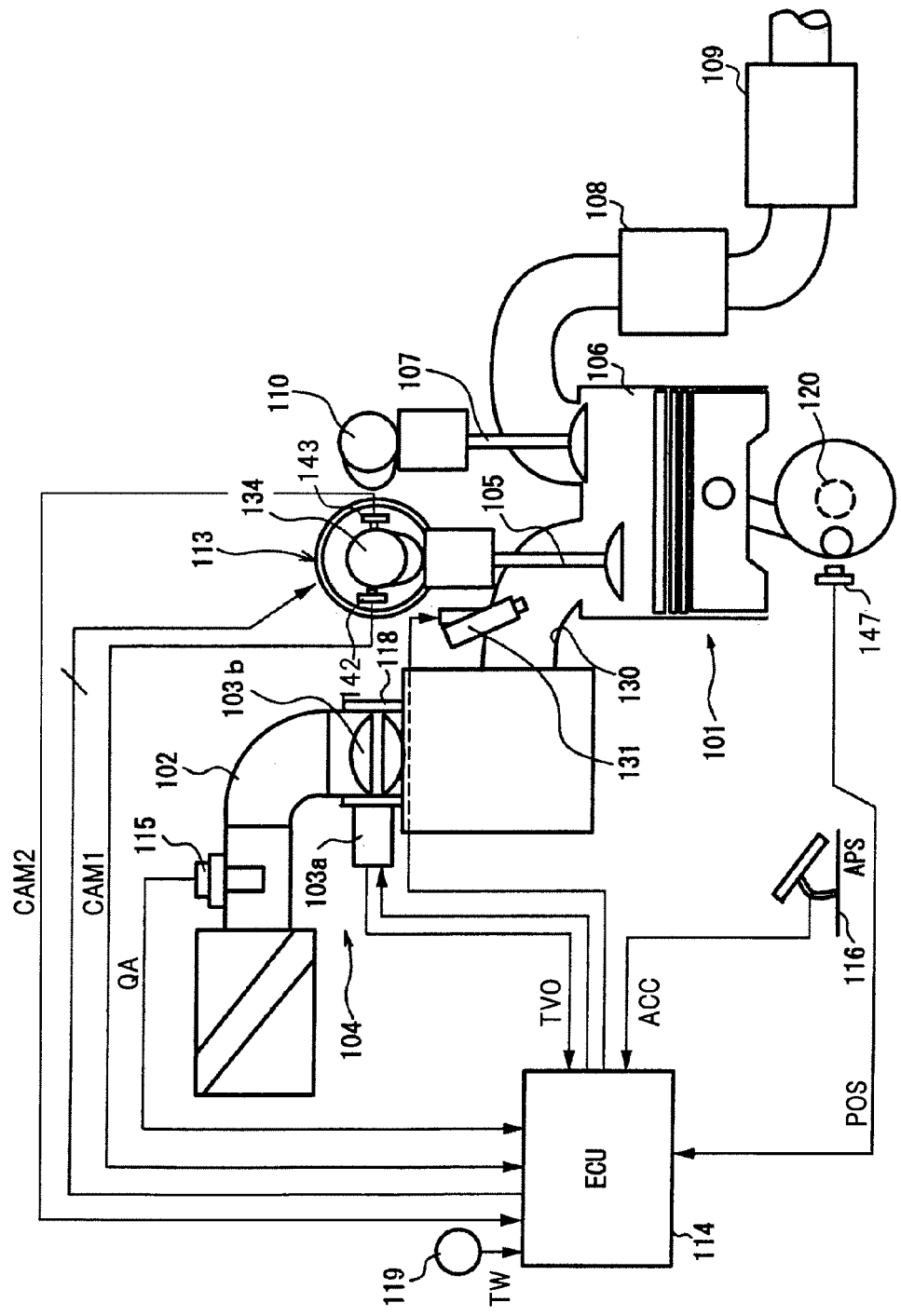
FIG. 17 is a systematic diagram of an engine according to a second embodiment of the present invention.

FIG. 17 shows a block diagram of engine 101 for a vehicle according to a second embodiment of the present invention.

A configuration of engine 101 shown in FIG. 17 is same as that of engine 101 shown in FIG. 1 only except for a sensor for detecting the angle of crankshaft 120 and a sensor for detecting the angle of camshaft 134.

Accordingly, components common to engine 101 shown in FIG. 1 and that shown in FIG. 17 are denoted by same numeral symbols and the description thereof is omitted.

Figure 18:
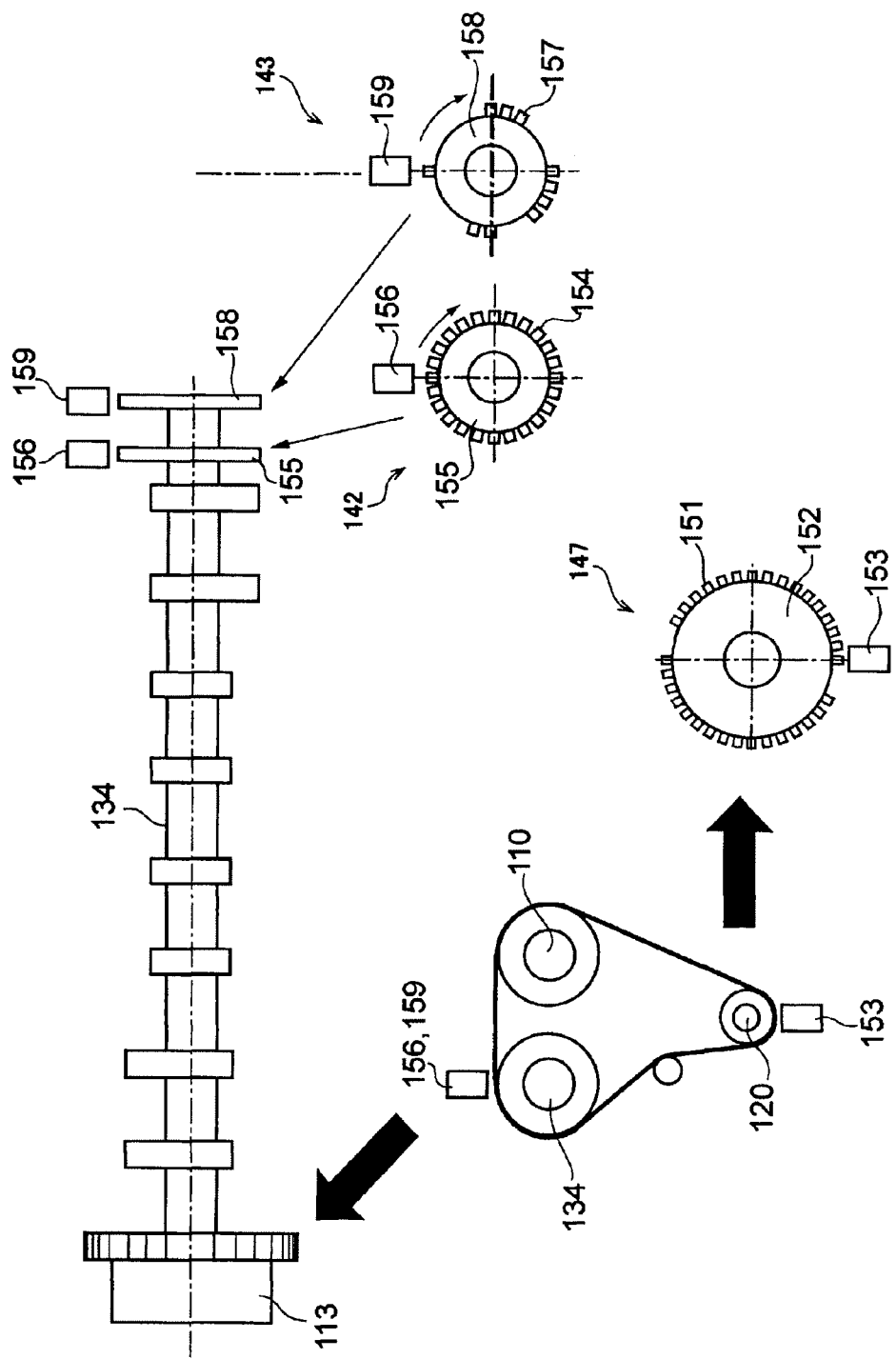
FIG. 18 is a diagram illustrating structures of a crank angle sensor, and first and second cam sensors according to the second embodiment of the present invention.

Structures of a crank angle sensor 147, and first and second cam sensors 142 and 143, which are provided for engine 101 shown in FIG. 17, are shown in FIG. 18.

Crank angle sensor 147 is axially supported on crankshaft 120, and comprises: a signal plate 152 disposed with protruding portions 151 as portions for being detected on a periphery thereof; and a pickup 153 fixed to engine 101 for detecting the protruding portions 151.

Protruding portions 151 of signal plate 152 are basically disposed at even intervals at pitches of crank angle of 10 deg, but portions at each of which two consecutive protruding portions 151 are eliminated are disposed on two places opposite to each other with the center of crankshaft 120 therebetween.

Note, protruding portion 151 to be eliminated may be one or can be consecutively deleted for three or more.

Figure 23:
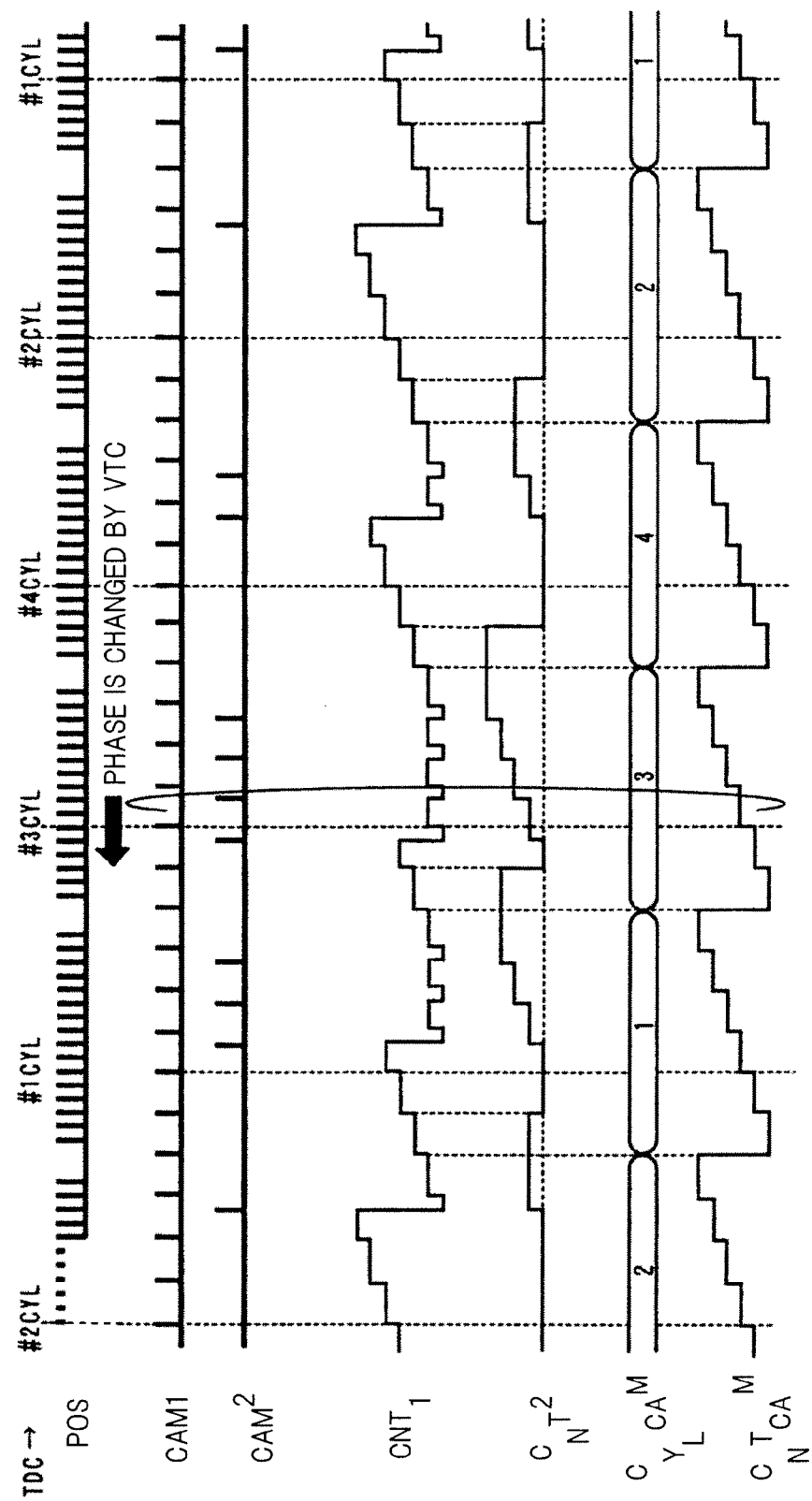
FIG. 23 is a time chart illustrating the correlation between the various signals POS, CAM1, CAM2, and various counters CNT1, CNT2, CYLCAM, CNTCAM, according to the second embodiment of the present invention.
Figure 24:
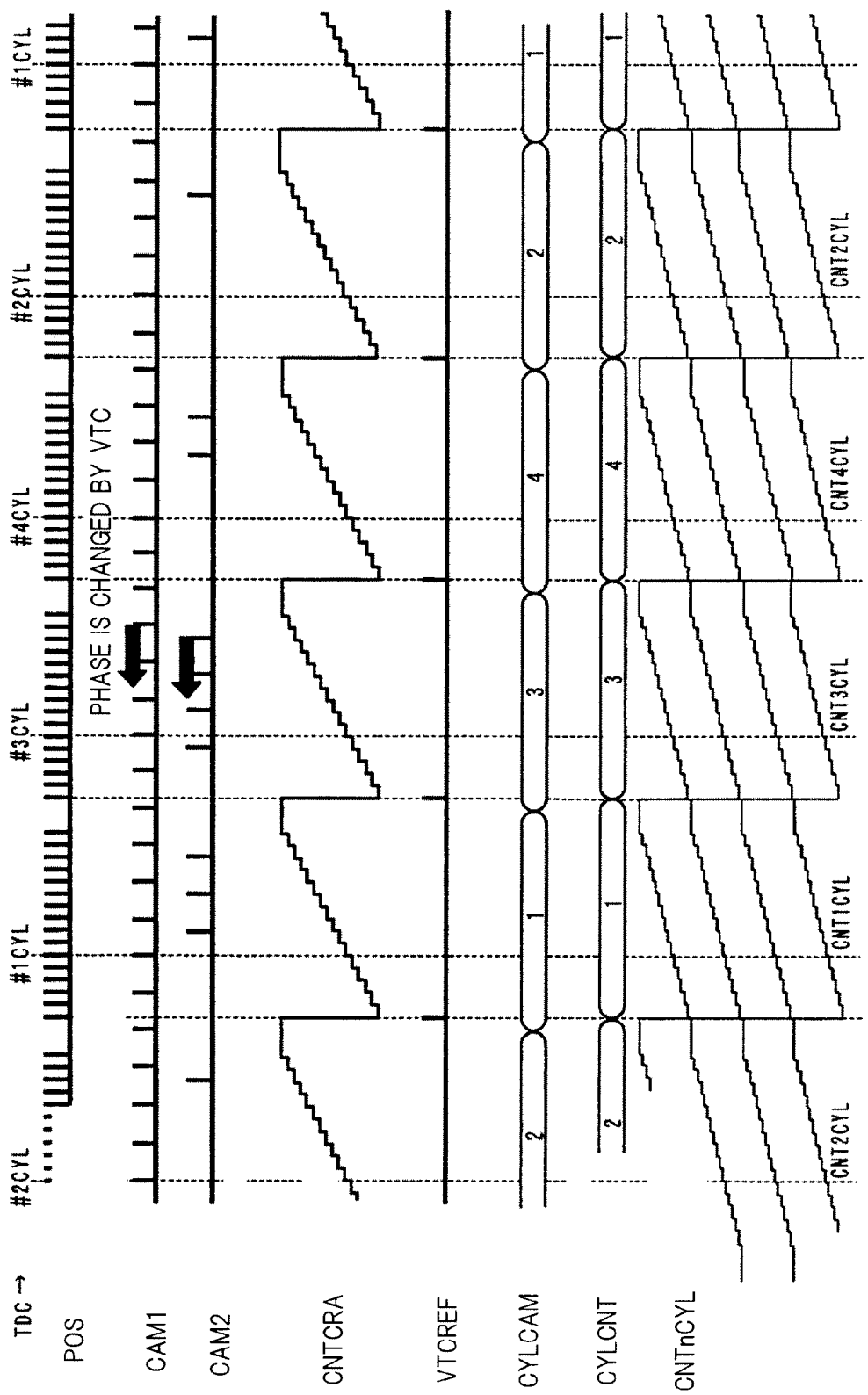
FIG. 24 is a time chart illustrating the correlation between the various signals POS, CAM1, CAM2, and various counters CNTCRA, CYLCAM, CYLCNT, CNTnCYL, according to the second embodiment of the present invention.

Then, the output of the unit crank angle signals POS from crank angle sensor 117, each of which is obtained by waveform shaping an output from pickup 153 to be output as the pulse signal, is performed such that 16 consecutive signals are output at each crank angle of 10 deg, and thereafter, two consecutive signals are not output, and then, 16 consecutive signals are again output at each crank angle of 10 deg, as shown in FIG. 23 and FIG. 24.

Accordingly, the crank angle is 180 deg between the first unit crank angle signal POS after the non-output of crank angle signal POS and the first unit crank angle signal POS after the next non-output of crank angle signal POS, and this crank angle of 180 deg corresponds to the stroke phase difference (ignition interval) among the cylinders in four-cylinder engine 101 of the present embodiment.

On the other hand, first cam sensor 142 is axially supported on an end of intake camshaft 134 opposite to the end thereof on which variable valve timing mechanism 113 is disposed, and comprises: a signal plate 155 disposed with protruding portions 154 as portions for being detected on a periphery thereof; and a pickup 156 fixed to engine 101 for detecting protruding portions 154.

Protruding portions 154 of signal plate 155 are disposed at even intervals at pitches of crank angle of 30 deg (cam angle of 15 deg), without any elimination.

Then, first cam angle signals CAM1 from first cam sensor 142, each of which is obtained by waveform shaping an output from pickup 156 to be output as a pulse signal, are output while holding a fixed cycle at each crank angle of 30 deg (cam angle of 15 deg) as shown in FIG. 23 and FIG. 24.

Further, second cam sensor 143 is axially supported on the end of intake camshaft 134 opposite to the end thereof on which variable valve timing mechanism 113 is disposed, and comprises: a signal plate 158 disposed with protruding portions 157 as portions for being detected on a periphery thereof; and a pickup 159 fixed to engine 101 for detecting protruding portions 157.

In signal plate 158, one protruding portion 157, three protruding portions 157, four protruding portions 157 and two protruding portions 157 are disposed at each cam angle of 90 deg. In portions at which plural protruding portions 157 are consecutively disposed, pitches of protruding portions 157 are set at crank angle of 30 deg (cam angle of 15 deg) which are same as the output cycle of first cam angle signals CAM1.

Then, second cam angle signals CAM2 from second cam sensor 143, each of which is obtained by waveform shaping an output from pickup 159 to be output as a pulse signal, are output such that only one signal, three consecutive signals, four consecutive signals and two consecutive signals are output at each cam angle of 90 deg (crank angle of 180 deg) as shown in FIG. 23 and FIG. 24.

The number of second cam angle signals CAM2 output at each crank angle of 180 deg indicates the cylinder number, and in four-cylinder engine 101 of the present embodiment, corresponds to that the stroke phase difference among the cylinders is crank angle of 180 deg and the ignition order is #1 cylinder→#3 cylinder→#4 cylinder→#2 cylinder.

Namely, in four-cylinder engine 101 of the present embodiment, the piston of each cylinder is positioned on the top dead center (the compression top dead center or the intake top dead center) at each crank angle of 180 deg, so that only one second cam angle signal CAM2 is output before the top dead center of #1 cylinder, three consecutive second cam angle signals CAM2 are output before the top dead center of #3 cylinder, four consecutive second cam angle signals CAM2 are output before the top dead center of #4 cylinder, and two consecutive second cam angle signals CAM2 are output before the top dead center of #2 cylinder.

Accordingly, by judging how many second cam angle signals CAM2 are output, it is possible to discriminate the cylinder of which piston is to be next positioned on the top dead center, and based on the cylinder discrimination result, the cylinder to which the fuel is to be injected to be ignited is detected, and further, based on the detection result, the injection pulse signal and an ignition signal are output.

Here, a fixed phase relation is held between the first cam angle signal CAM1 and the second cam angle signal CAM2, but a phase relation between the unit crank angle signal POS and the first and second cam angle signals CAM1 and CAM2, is changed due to the variation of the rotating phase of intake camshaft 134 relative to crankshaft 120 by variable valve timing mechanism 113.

In the control of variable valve timing mechanism 113, an actual rotating phase is detected, and also, the target rotating phase is computed based on the engine operating conditions (an engine load, the engine rotating speed and the like), so that the manipulated variable for electromagnetic retarder 24 is feedback controlled by the proportional plus integral plus derivative action and the like based on the difference between the actual rotating phase and the target rotating phase.

Hereunder, there will be described the details of the rotating phase detection using crank angle sensor 147, first cam sensor 142 and second cam sensor 143.

Figure 19:
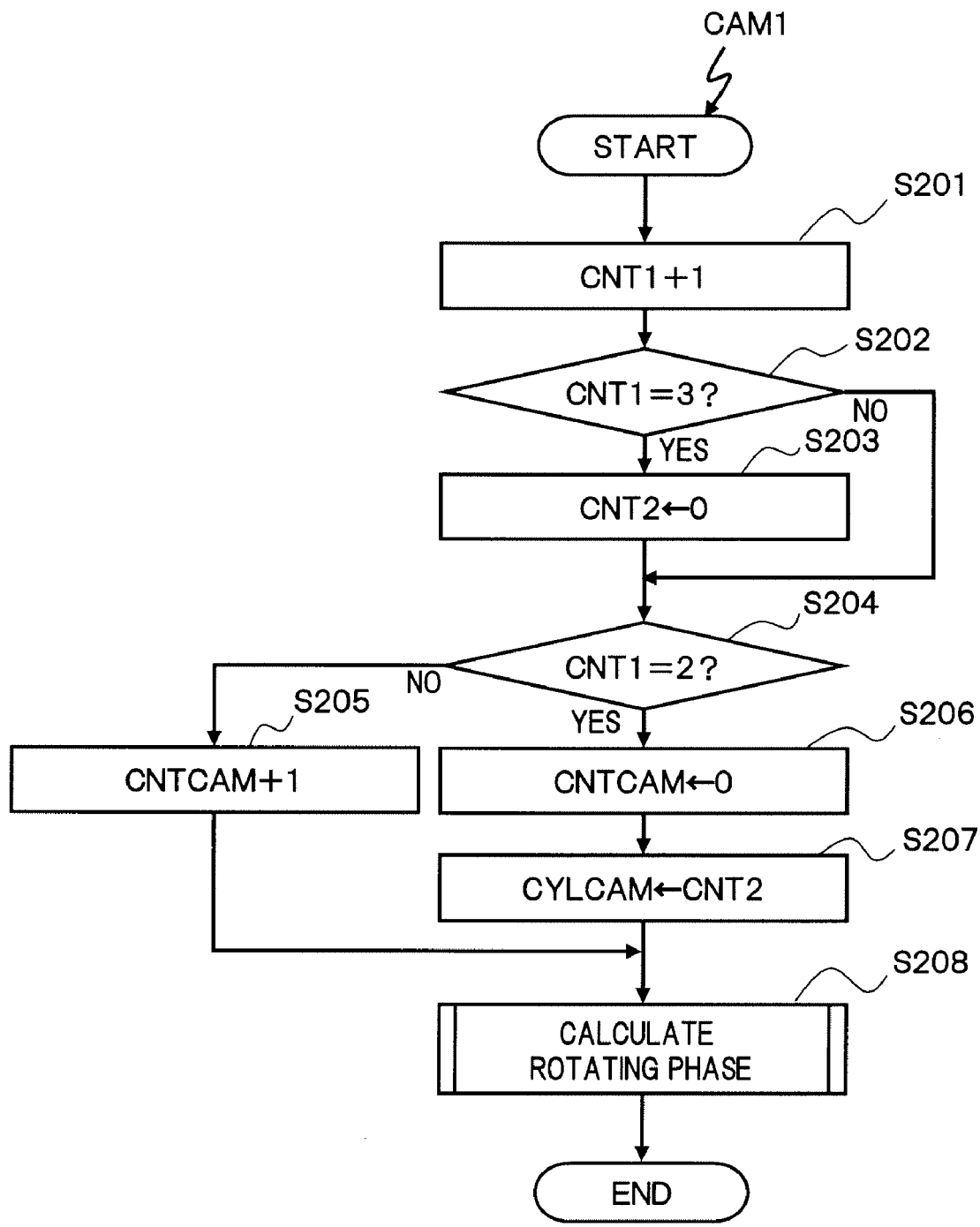
FIG. 19 is a flowchart illustrating a process executed at each time when a first cam angle signal CAM1 is generated, according to the second embodiment of the present invention.

A flowchart of FIG. 19 is executed at each time when first cam angle signal CAM1 is generated. Firstly, in step S201, a counter CNT1 is counted up by 1 (refer to FIG. 23).

In step S202, it is judged whether or not a value of counter CNT1 is 3, and if the value of counter CNT1 is 3, the routine proceeds to step S203, whereas if the value of counter CNT1 is not 3, the routine bypasses step S203 to proceed to step S204.

In step S203, as described later, a counter CNT2, which is counted up by 1 at each time when the second cam angle signal CAM2 is generated, is reset to 0 (refer to FIG. 23).

In step S204, it is judged whether or not counter CNT1 is 2, and if the value of counter CNT1 is not 2, the routine proceeds to step S205 where a counter CNTCAM is counted up by 1.

On the other hand, if CNT1=2, the routine proceeds to step S206 where counter CNTCAM is reset to 0, and further, proceeds to step S207 where a value of counter CNT2 at the time is set to a counter CYLCAM (refer to FIG. 23).

Following the process in step S205 or step S207, the routine next proceeds to step S208 where the rotating phase of intake camshaft 134 relative to crankshaft 120 is calculated. The details of the process in step S208 will be described later based on a flowchart of FIG. 22.

Figure 20:
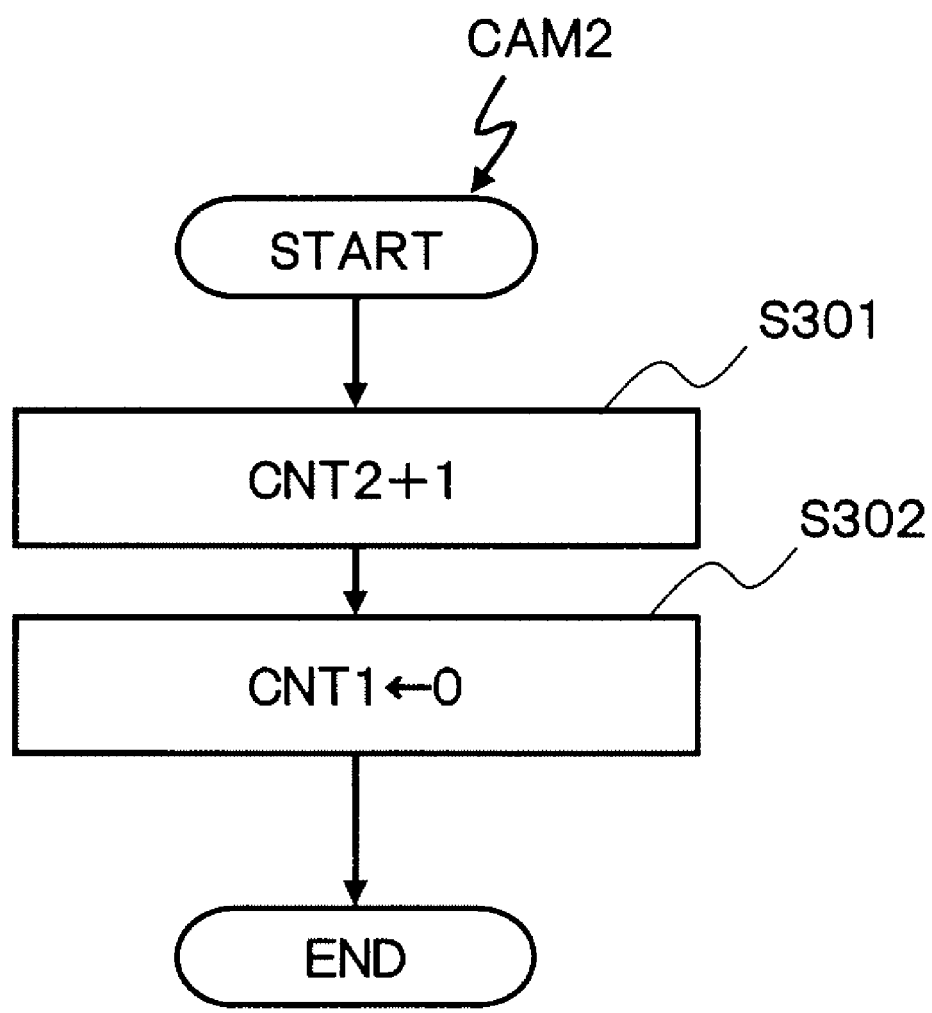
FIG. 20 is a flowchart illustrating a process executed at each time when a second cam angle signal CAM2 is generated, according to the second embodiment of the present invention.

A flowchart of FIG. 20 is executed at each time when the second cam angle signal CAM2 is generated. In step S301, counter CNT2 is counted up by 1, and in step S302, counter CNT1 is reset to 0 (refer to FIG. 23).

Counter CNTCAM has a value which is counted up by 1 at each time when the first cam angle signal CAM1 is generated and is reset to 0 at each crank angle of 180 deg, so that timing when counter CNTCAM is reset to 0 is regarded as the reference cam angle position, and further, based on a value of counter CNTCAM, it is possible to identify what number of first cam angle signal CAM1 from the reference cam angle position is output.

Further, counter CYLCAM indicates the cylinder discrimination result which is switched at each crank angle of 180 deg, and accordingly, by matching counter CYLCAM to counter CNTCAM, it is possible to identify the latest first cam angle signal CAM1 from all of first cam angle signals CAM1 output during one rotation of intake camshaft 134.

Figure 21:
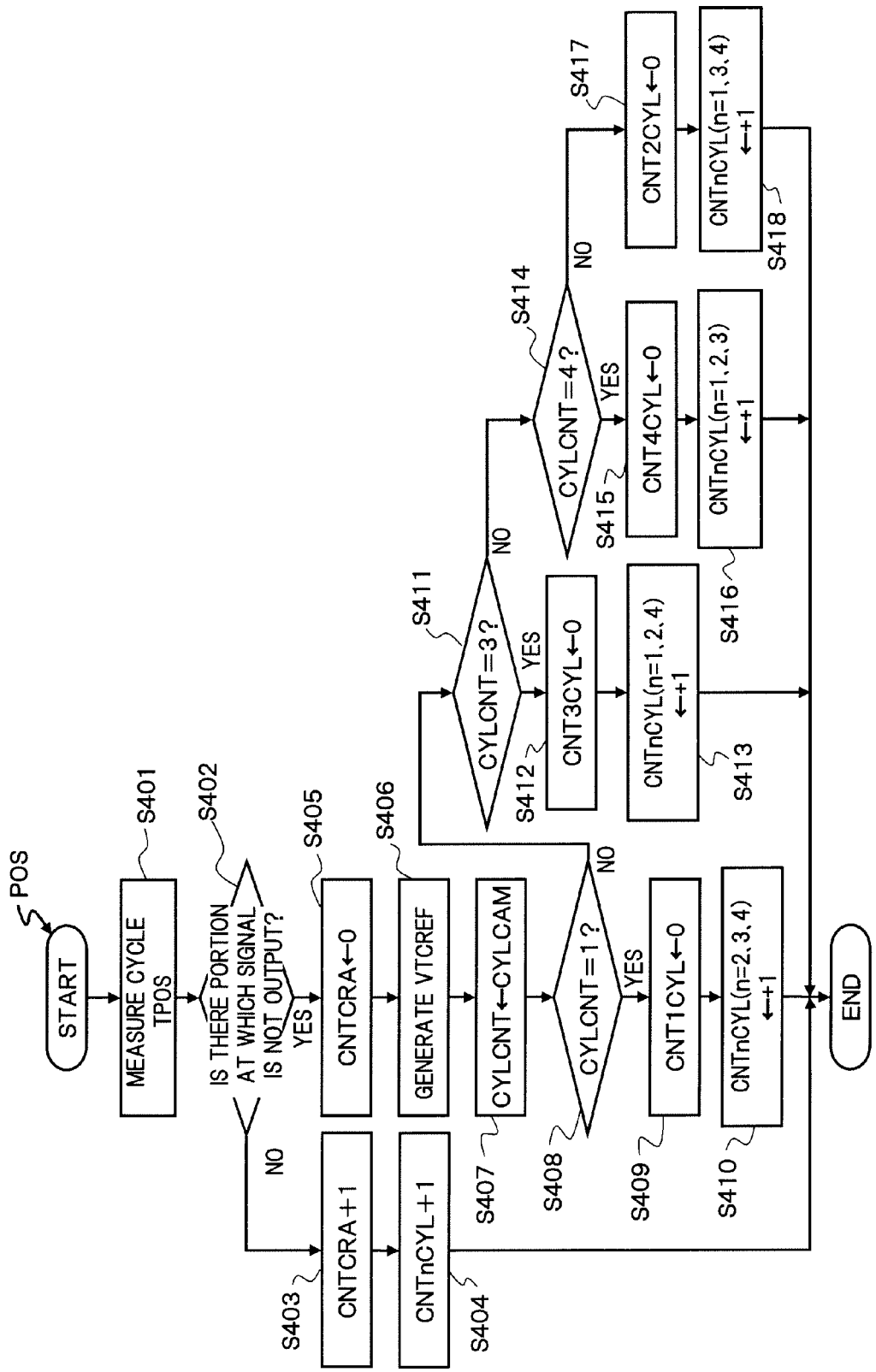
FIG. 21 is a flowchart illustrating a process executed at each time when a unit crank angle signal POS is generated, according to the second embodiment of the present invention.

A flowchart of FIG. 21 is executed at each time when the unit crank angle signal POS is generated. In step S401, the generation cycle TPOS of the unit crank angle signal POS is measured.

In step S402, it is judged based on the ratio between the previous value of the cycle TPOS and the present value thereof whether or not the present cycle TPOS is the measurement result of the portion at which the unit crank angle signal POS is not output.

In the portion at which the unit crank angle signal POS is not output, a time required for the rotation by crank angle of 30 deg is measured as the cycle TPOS, whereas in other portion at which the unit crank angle signal POS is output, a time required for the rotation by crank angle of 10 deg is measured as the cycle TPOS. Therefore, both of the cycles TPOS largely differ from each other more than a difference therebetween due to normal rotating variation.

Accordingly, it is possible to judge, based on the ratio between the previous value of the cycle TPOS and the present value thereof, whether or not the present cycle TPOS is the measurement result of the portion at which the unit crank angle signal POS is not output.

If it is judged in step S402 that the present cycle TPOS is the measurement result of the cycle of crank angle of 10 deg and not the measurement result of the portion at which the unit crank angle signal POS is not output, the routine proceeds to step S403.

In step S403, a counter CNTCRA is counted up by 1, and in next step S404, counters CNTnCYL (n=1 to 4) for respective cylinders are counted up by 1 (refer to FIG. 24).

On the other hand, if it is judged in step S402 that the present cycle TPOS is the measurement result of the portion at which the unit crank angle signal POS is not output, the routine proceeds to step S405.

In step S405, counter CNTCRA, which has been counted up by 1 at each time when the unit crank angle signal POS is generated, is reset to 0, and in next step S406, a reference angle position signal VTCREF of crankshaft 120 is generated (refer to FIG. 24).

The reference angle position signal VTCREF is output at each portion at which the unit crank angle signal POS is not output, that is, at each crank angle of 180 deg, so that counter CNTCRA is reset to 0 at output timing of the reference angle position signal VTCREF.

In step S407, a value of counter CYLCAM at the time is set to a counter CYLCNT (refer to FIG. 24).

In step S408, it is judged whether or not a value of counter CYLCNT is 1, in other words, whether or not #1 cylinder is positioned on the top dead center.

Here, if CYLCNT=1, the routine proceeds to step S409 where counter CNT1CYL for the unit crank angle signal POS corresponding to #1 cylinder is reset to 0, and in next step S410, counters CNTnCYL (n=2 to 4) other than counter CNT1CYL for respective cylinders are counted up by 1.

Similarly to the above, in steps S411 to S413, counter CNT3CYL is reset to 0 when CYLCNT=3, and also, counters CNTNCYL (n=1, 2, 4) other than counter CNT3CYL for respective cylinders are counted up by 1.

In steps S414 to S416, counter CNT4CYL is reset to 0 when CYLCNT=4, and also, counters CNTnCYL (n=1 to 3) other than counter CNT4CYL for respective cylinders are counted up by 1.

Further, if it is judged in step S414 that CYLCNT is not 4, since it is judged that CYLCNT=2, counter CNT2CYL is reset to 0 in step S417, and counters CNTnCYL (n=1, 3, 4) other than counter CNT2CYL for respective cylinders are counted up by 1 in step S418.

By the above process, for counters CNTnCYL for respective cylinders, when CYLCNT=n, only counter CNTnCYL for the number n cylinder is reset to 0, and other counters are counted up by 1 at each time when the unit crank angle signal POS is generated (refer to FIG. 24).

In other words, counters CNTnCYL for respective cylinders have values, each of which is counted up by 1 at each time when the unit crank angle signal POS is generated, and is reset to 0 at each two rotations of crankshaft 120, and reset timing of respective counters CNTnCYL is deviated from each other by crank angle of 180 deg.

Figure 22:
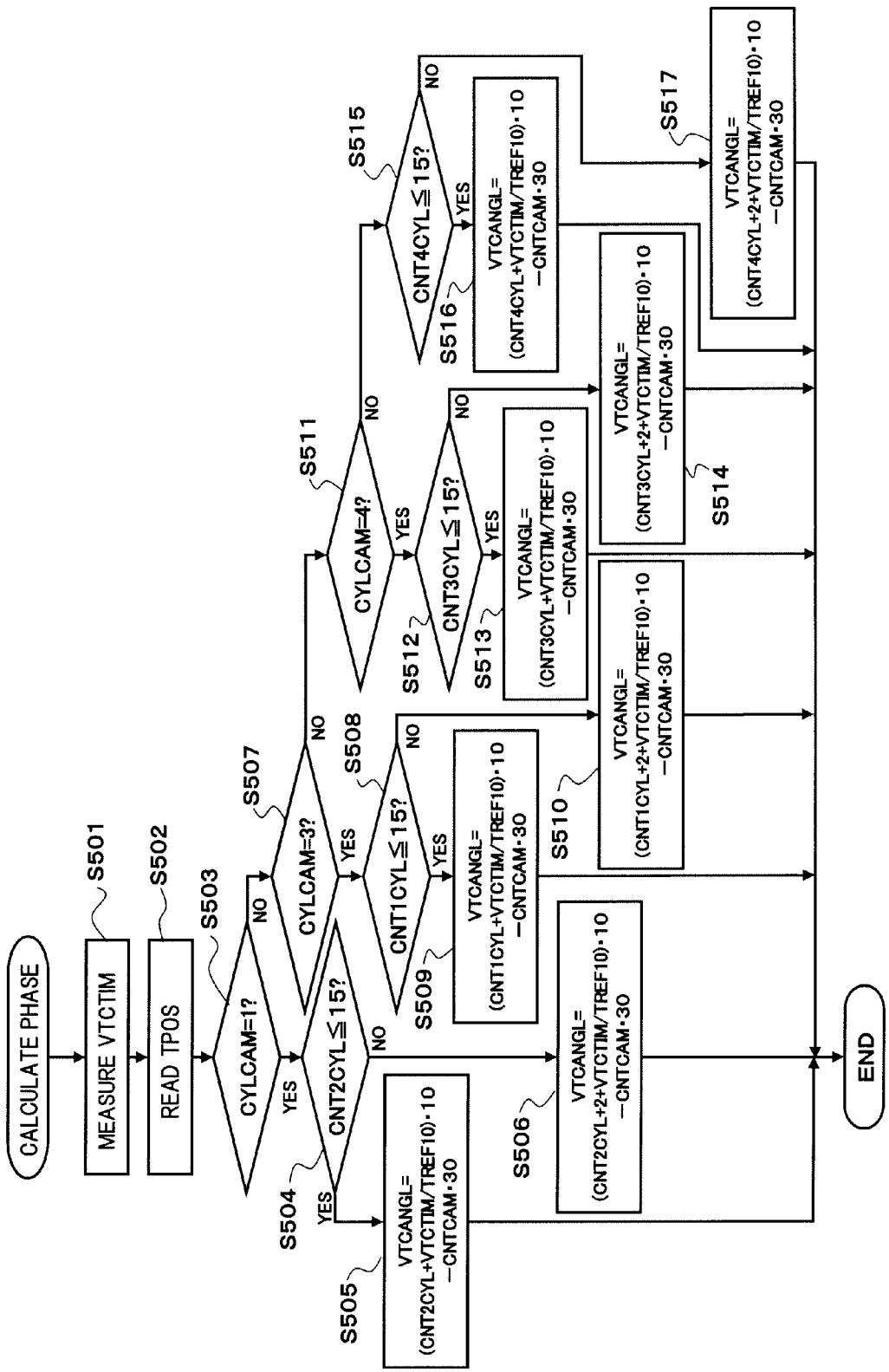
FIG. 22 is a flowchart illustrating the details of a rotating phase calculating process executed at each time when the first cam angle signal CAM1 is generated, according to the second embodiment of the present invention.

Next, there will be described the details of calculation of the rotating phase in step S208, based on the flowchart of FIG. 22.

Figure 25:
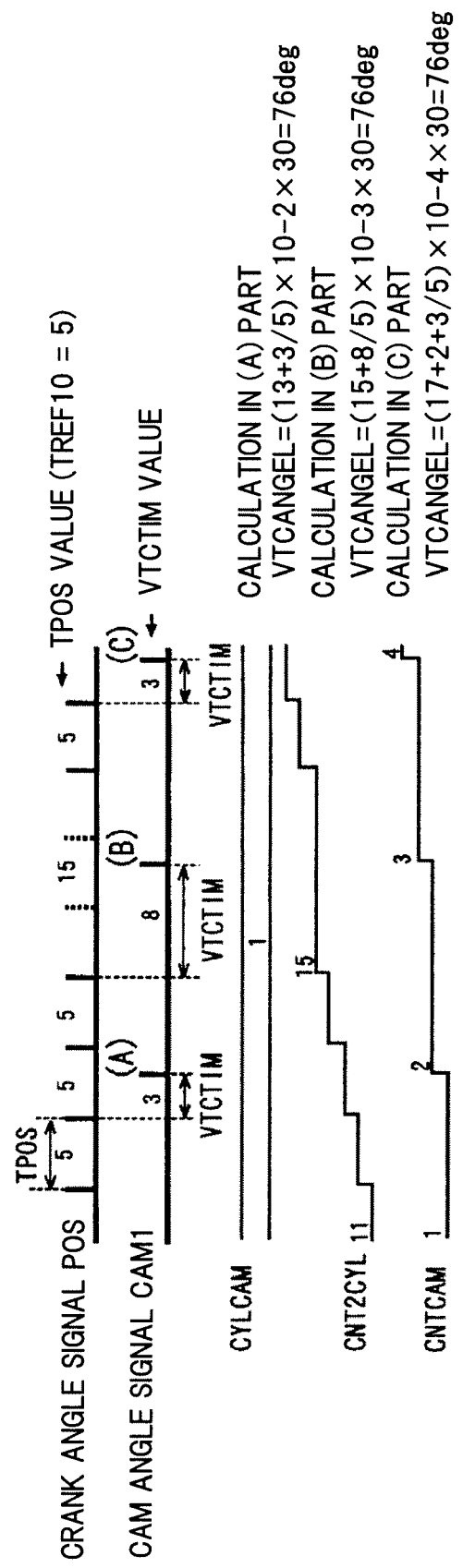
FIG. 25 is a time chart for explaining the rotating phase calculating process according to the second embodiment of the present invention.

In step S501, a time VTCTIM from the unit crank angle signal POS output just before to the present first cam angle signal CAM1 is obtained (refer to FIG. 25).

The time VTCTIM can be obtained based on a difference between a value of a counter counted up at each unit minute time, which is updated to be stored at each time when the unit crank angle signal POS is generated, and the counter value at present (a time point at which the first cam angle signal CAM1 is generated).

In step S502, data of the cycle TPOS of the unit crank angle signal POS lastly measured is read.

In step S503, it is judged whether or not the value of counter CYLCAM is 1, and if CYLCAM=1, the routine proceeds to step S504.

In step S504, it is judged whether or not the value of counter CNT2CYL is equal to or smaller than 15, and formulas to be used for the computation of rotating phase VTCANGL are switched between the case of CNT2CYL$\leqq$15 and the case of CNT2CYL>15.

If CNT2CYL$\leqq$15, the routine proceeds to step S505 where the rotating phase VTCANGL is calculated as VTCANGL= (CNT2CYL+VTCTIM/TREF10)×10−CNTCAM×30 [deg].

On the other hand, if CNT2CYL>15, the routine proceeds to step S506 where the rotating phase VTCANGL is calculated.

$$VTCANGL=(CNT2CYL+2+VTCTIM/TREF10)\times 10-CNTCAM\times 30 \text{ [deg]}.$$

TREF10 is a time required for the rotation of crankshaft 120 by 10 deg, and if the cycle TPOS is the measurement result of the cycle of POS signal output at 10 deg interval, TREF10=TPOS, whereas if the cycle TPOS is the measurement result of the portion at which the POS signal is not output, since the cycle TPOS is a time required for the rotation of crankshaft 120 by 30 deg, TREF10=TPOS/3 (refer to FIG. 25).

It is possible to judge whether or not the cycle TPOS is the measurement result of the portion at which the POS signal is not output, based on whether or not the reference angle position signal VTCREF is generated.

CNT2CYL indicates the number of POS signals from a time point at which the reference angle position signal VTCREF is generated until the latest first cam angle signal CAM1 is generated. Further, VTCTIM/TREF 10 indicates how many 10 deg cycles a period of time between the last POS signal and the latest first cam angle signal CAM1 corresponds to. Accordingly, CNT2CYL+VTCTIM/TREF10 is multiplied by 10, to thereby indicate the crank angle of from the timing when CNT2CYL is reset to 0 to the present first cam angle signal CAM1.

However, in the case where the portion at which the POS signal is not output is included during the counting up of CNT2CYL up to the time, the value of CNT2CYL does not correctly indicates the previous crank rotation angle.

Therefore, it is judged whether or not CNT2CYL≧15, to thereby judge whether or not CNT2CYL is counted up while including the portion at which the POS signal is not output, and if the portion at which the POS signal is not output is included, CNT2CYL is added with 2 so as to correspond to the case where CNT2CYL is counted up excessively by 2 if the portion at which the POS signal is not output (refer to C of FIG. 25).

Here, (CNT2CYL+VTCTIM/TREF10)×10 or (CNT2CYL+2+VTCTIM/TREF10)×10 indicates the angle from the reference angle position of crankshaft 120 to the latest first cam angle signal CAM1. However, if the first cam angle signal CAM1 is not specified, the rotating phase of intake camshaft 134 relative to crankshaft 120 cannot be judged.

On the other hand, as described in the above, counter CNTCAM has the value to indicate what number of first cam angle signal CAM1 from the reference cam angle position is generated, and is counted up at each crank angle of 30 deg. Therefore, CNTCAM×30 indicates the rotation angle from the reference cam angle position to the present first cam angle signal CAM1.

Accordingly, CNTCAM×30 is subtracted from (CNT2CYL+VTCTIM/TREF10)×10 or (CNT2CYL+2+VTCTIM/TREF10)×10, to thereby indicate the crank angle of from the reference angle position of crankshaft 120 to the reference angle position of intake camshaft 134. The crank angle of from the reference angle position of crankshaft 120 to the reference angle position of intake camshaft 134 is not varied if the rotating phase of intake camshaft 134 relative to crankshaft 120 is fixed, and is varied with a change of the rotating phase.

Similarly to the above, hereunder, if the value of counter CYLCAM is 3, it is discriminated whether CNT1CYL≦15 or CNT1CYL>15 (steps S507 to S508). Then, if CNT1CYL≦15, the rotating phase is calculated based on VTCANGL=(CNT1CYL+VTCTIM/TRE10)×10−CNTCAM×30 [deg] (step S509). If CNTICYL>15, the rotating phase is calculated based on VTCANGL=(CNT1CYL+2+VTCTIM/TREF10)×10−CNTCAM×30 [deg] (step S510).

Further, if the value of counter CYLCAM is 4, it is discriminated whether CNT3CYL≦15 or CNT3CYL>15 (steps S511 to S512). Then, if CNT3CYL≦15, the rotating phase is calculated based on VTCANGL=(CNT3CYL+VTCTIM/TREF10)×10−CNTCAM×30 [deg] (step S513). If CNT3CYL>15, the rotating phase is calculated based on VTCANGL=(CNT3CYL+2+VTCTIM/TREF10)×10−CNTCAM×30 [deg] (step S514).

Furthermore, if it is judged in step S511 that CYLCAM is not 4, it is judged that CYLCAM=2, and in step S515, it is discriminated whether CNT4CYL≦15 or CNT4CYL>15. Then, if CNT4CYL≦15, the rotating phase is calculated based on VTCANGL=(CNT4CYL+VTCTIM/TREF10)×10−CNTCAM×30 [deg] (step S516). If CNT4CYL>15, the rotating phase is calculated based on VTCANGL=(CNT4CYL+2+VTCTIM/TREF10)×10−CNTCAM×30 [deg] (step S517).

By the above computation process, above VTCANGL indicating the rotating phase of intake camshaft 134 relative to crankshaft 120 is calculated at each crank angle of 30 deg, and therefore, it is possible to detect the rotating phase in a sufficiently short cycle even at the low rotation time, and furthermore, it is possible to perform the cylinder discrimination based on the second cam angle signal CAM2.

For example, if an angle from the generation of reference angle position signal VTCREF until the second cam angle signal CAM2 is firstly output is measured as data indicating the rotating phase, the detection result of rotating phase is updated at each crank angle of 180 deg. Particularly, at the low rotation time, the cycle in which the detection result of rotating phase is updated is lengthened, so that variable valve timing mechanism 113 cannot be feedback controlled at a high speed with high precision.

The second cam angle signal CAM2 is for performing the cylinder discrimination, and in four-cylinder engine 101 of the present embodiment, the cylinder discrimination is performed at each 180 deg. Therefore, if the rotating phase is to be detected using the cylinder discriminating signal, an update cycle of rotating phase is constrained by a cylinder discrimination cycle.

Namely, if the rotating phase is to be detected using the cylinder discriminating signal, the rotating phase is detected at each crank angle of 180 deg, and, for example at an idle operation time with an engine rotating speed of 600 rpm, the rotating phase can only be detected once every 50 ms.

In recent years, an operating region in which the rotating phase of camshaft is controlled by the variable valve timing mechanism tends to extend to the low rotation speed side. However, as described above, if the detection cycle in a low rotation speed region is long, it is hard to converge the actual rotating phase in the target rotating phase without overshooting and also with good response, and this is a factor impeding the extension of a control region of rotating phase to the low rotation speed region.

Here, in order to shorten the detection cycle of rotating phase in the low rotation speed region, in the case where for example, the number of cam signals output per one rotation of camshaft is increased and the reference crank angle position is set at intervals same as generation intervals of the cam signals, if a change angle of the rotating phase of camshaft is large, there is caused a problem in that the rotating phase is erroneously detected.

Namely, in the case where the angle from the reference crank angle position to the cam signal appearing immediately after that reference crank angle position is measured, if the rotating phase of camshaft is advanced, the angle from the reference crank angle position to the immediately appearing cam signal is decreased. Then, if the position at which the cam signal is generated is advanced exceeding the reference crank angle position, the cam signal output immediately after the reference crank angle position is replaced by the cam signal which is delayed by one cycle to the previous cam signal. Therefore, although the rotating phase is largely advanced in fact, the rotating phase is detected as in a retarded angle state.

Contrary to the above, in the present embodiment, sensor 132 for outputting the first cam angle signal CAM1 at each unit cam angle is disposed separately from sensor 133 for outputting the second cam angle signal CAM2 as the cylinder discriminating signal, so that the first cam angle signal CAM1 is individually specified based on the second cam angle signal CAM2 while the cylinder discrimination being performed based on the second cam signal CAM2, to thereby enable the detection of rotating phase at each generation of first cam angle signal CAM1.

Consequently, it is possible to detect the rotating phase at each generation of first cam angle signal CAM1, and even at the low rotation time, it is possible to update the detection result of rotating phase in a sufficiently short cycle, and further, it is possible to feedback control variable valve timing mechanism 113 at a high speed with high precision.

Incidentally, it is possible to set the generation cycle of first cam angle signal CAM1 at an angle smaller than the crank angle of 30 deg. However, since the update cycle of rotating phase can be restricted to the necessary and sufficient update cycle by setting the generation cycle of first cam angle signal CAM1 at 30 deg, the first cam angle signal CAM1 is set at 30 deg cycle in the present embodiment, and accordingly, it is apparent that the generation cycle of first cam angle signal CAM 1 is not limited to 30 deg cycle.

Further, in the present embodiment, engine 101 is the four-cylinder engine. However, the present invention can be applied to a six-cylinder engine in which a stroke phase difference among cylinders is 120 deg, or the like, and accordingly, the number of cylinders is not limited.

Moreover, the second cam angle signal CAM2 to be used for the cylinder discrimination indicates the cylinder number by the pulse generation numbers in the present embodiment, but may indicate the cylinder number depending on pulse width differences.

Further, the configuration may be such that a unit crank angle sensor for outputting the unit crank angle signal POS at 10 deg without non-output of crank angle signal POS and a reference crank angle sensor for generating the reference angle position signal VTCREF are respectively provided.

Furthermore, in the case where the cylinder discrimination using first and second cam sensors 142 and 143 is unnecessary to be performed, for example, the second cam angle signal is output, for example, once per one rotation of camshaft, and the generation number of first cam angle signals from the generation time point of the second cam angle signal is counted up, so that the first cam angle signals are individually specified to be used for the detection of rotating phase.

Moreover, in the present embodiment, as shown in FIG. 18, first and second cam sensors 142 and 143 are disposed on the end of camshaft 134 opposite to the side on which variable valve timing mechanism 113 is disposed. However, it is possible to dispose one of cam sensors 142 and 143 is disposed on the end on the side on which variable valve timing mechanism 113 is disposed, and to dispose the other cam sensor on the end opposite to the side on which variable valve timing mechanism 113 is disposed.

As described in the above, when first cam sensor 142 is disposed on one end of camshaft 134 and second cam sensor 143 is disposed on the other end thereof, the layout of first and second cam sensors 142 and 143 to the engine can be easily performed.

Further, as means for performing the cylinder discrimination based on the second cam angle signal CAM2 from second cam sensor 143, there is means as follows.

Figure 26:
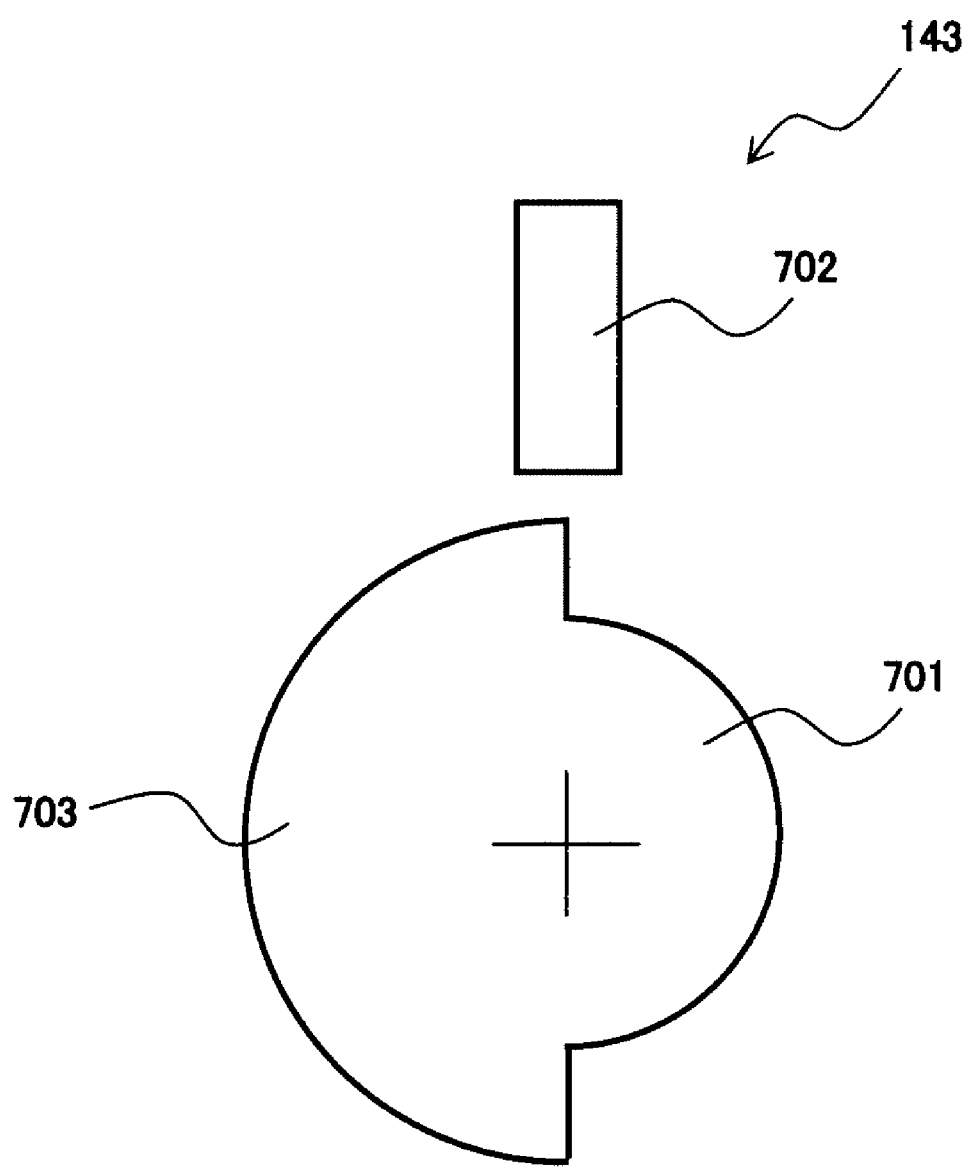
FIG. 26 is a diagram illustrating another structure of the second cam angle sensor according to the second embodiment of the present invention.
Figure 27:
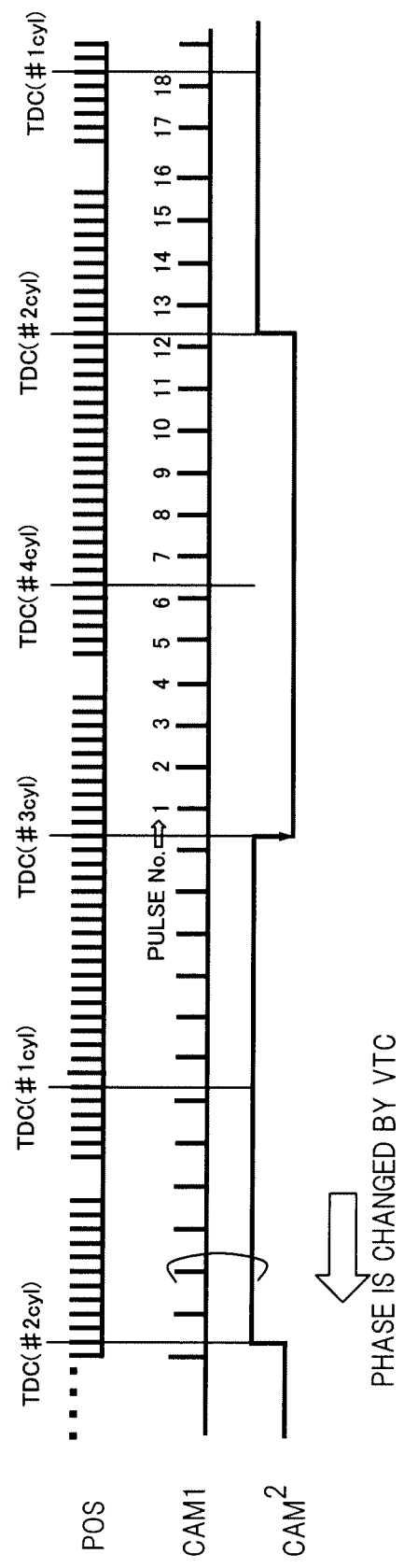
FIG. 27 is a time chart illustrating the correlation between the second cam angle signal CAM2 output from the second cam angle sensor shown in FIG. 26, and the unit crank angle signal POS output from the crank angle sensor shown in FIG. 28.
Figure 28:
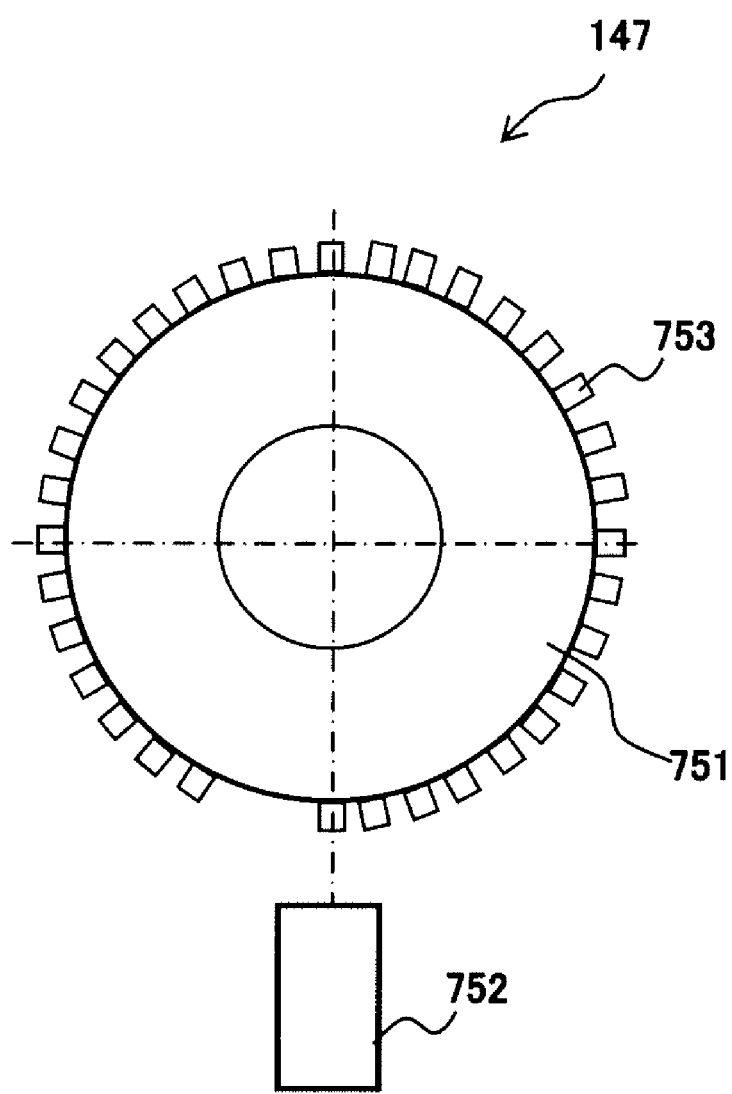
FIG. 28 is a diagram illustrating another structure of the crank angle sensor according to the second embodiment of the present invention.

FIG. 26 to FIG. 28 show embodiments for outputting the second cam angle signal of which signal level at the reference angle position (two positions at which the unit crank angle signals POS are not output) is changed over to be high or low at each one rotation of crankshaft 120, to detect the reference cam angle position while performing the cylinder discrimination.

Cam sensor 143 shown in FIG. 26 comprises: a signal plate 701 axially supported on camshaft 134; and a pickup 702 fixed to engine 101 for detecting that a portion for being detected of signal plate 701 comes close.

Signal plate 701 has 180 deg ranges, one of which is formed to have a diameter larger than that of the other 180 deg range, and is formed with a consecutive protruding portion 703 (portion for being detected) of 180 deg range, so that the signal level of the second cam angle signal CAM2 output from pickup 702 is changed over to be high or low at each half rotation of camshaft 134 (at each one rotation of crankshaft 120).

Further, as shown in FIG. 27, the rising position of the second cam angle signal CAM2 is aligned with the top dead center of #2 cylinder, and the trailing position of the second cam angle signal CAM2 is aligned with the top dead center of #3 cylinder.

On the other hand, crank angle sensor 147 comprises: a signal plate 751 as shown in FIG. 28; and a pickup 752 fixed to engine 101 for detecting that portions for being detected of signal plate 751 come close.

Protruding portions 753 of signal plate 751 are basically disposed at even intervals at pitches of crank angle of 10 deg, but a portion at which two consecutive protruding portions 753 are eliminated is disposed on one place in signal plate 751.

Namely, in crank angle sensor 147 shown in FIG. 18, the setting is made so that the unit crank angle signal POS is not generated at each 180 deg rotation of crankshaft 120 (the generation interval of the unit crank angle signal POS is lengthened). However, in crank angle sensor 147 shown in FIG. 28, the setting is made so that the unit crank angle signal POS is not generated at each one rotation of crankshaft 120 (the generation interval of the unit crank angle signal POS is lengthened).

Further, as shown in FIG. 27, the positions at which the unit crank angle signal POS is not output are set before the top dead center of #1 cylinder and before the top dead center of #4 cylinder.

Accordingly, at the generation time point of the reference angle position signal VTCREF before the top dead center of #1 cylinder, the signal level of the second cam angle signal CAM2 is high, and at the generation time point of the reference angle position signal VTCREF before the top dead center of #4 cylinder, the signal level of the second cam angle signal CAM2 is low.

In other words, the reference angle position signal VTCREF is output once per one complete rotation of crankshaft 120, and the signal level of the second cam angle signal CAM2 at the generation time point of this reference angle position signal VTCREF is changed over to be high or low at each one rotation of crankshaft 120.

Therefore, at the generation time point of the reference angle position signal VTCREF (the portion at which the unit crank angle signal POS is not output), it is possible to judge whether #1 cylinder is on the top dead center or #4 cylinder is on the top dead center, depending on whether the signal level of the second cam angle signal CAM2 is high or low.

Then, at the time point when crankshaft 120 is rotated by crank angle of 180 deg from the cylinder discrimination timing, the present cylinder can be discriminated based on the previous cylinder discrimination result, and if the top dead center of #1 cylinder is detected at the previous generation time point of the reference angle position signal VTCREF, it is judged that #3 cylinder is on the top dead center at the time point when crankshaft 120 is further rotated by 180 deg.

Further, if the top dead center of #4 cylinder is detected at the previous generation time point of the reference angle position signal VTCREF, it is judged that #2 cylinder is on the top dead center at the time point when crankshaft 120 is further rotated by 180 deg.

Consequently, by judging whether the signal level of the second cam angle signal CAM2 is high or low at the generation time point of the reference angle position signal VTCREF (the portion at which the unit crank angle signal POS is not output), the top dead centers of #1 cylinder to #4 cylinder can be all detected.

Further, as shown in FIG. 27, the discrimination of the first cam angle signal CAM1 based on the second cam angle signal CAM2 can be performed, for example, by assigning a number for the first cam angle signal CAM1 input after the trailing of the second cam angle signal CAM2 (by counting up the first cam angle signals CAM1).

Namely, if the first cam angle signals CAM1 are output at 30 deg pitches, the cam angle can be detected at 30 deg pitch on the basis of the trailing of the second cam angle signal CAM2 (the top dead center of #3 cylinder), and accordingly, similarly to the above embodiment, by obtaining the time VTCTIM from the unit crank angle signal POS output just before until the first cam angle signal CAM1 (refer to FIG. 25), it is possible to detect the rotating phase at each generation of the first cam angle signal CAM1.

Incidentally, it is possible to assign the number for the first cam angle signal CAM1 input after the rising of the second cam angle signal CAM2 (the top dead center of #2 cylinder) (to count up the first cam angle signals CAM1) on the basis of the rising of the second cam angle signal CAM2.

Consequently, even in the configuration using second cam sensor 143 and crank angle sensor 147 as shown in FIG. 26 and FIG. 28, it is possible to update the detection result of rotating phase in a sufficiently short cycle, to thereby feedback control variable valve timing mechanism 113 at a high speed with high precision.

Further, a signal form of the second cam angle signal CAM2 is simplified in comparison with the cylinder discrimination based on the pulse number, so that the computation process becomes easier, and also, it becomes possible to perform the necessary and sufficient detection even in the case where a diameter of signal plate 701 is relatively small. Therefore, cam sensor 143 can be miniaturized and the layout thereof to the engine can be easily made.

Figure 29:
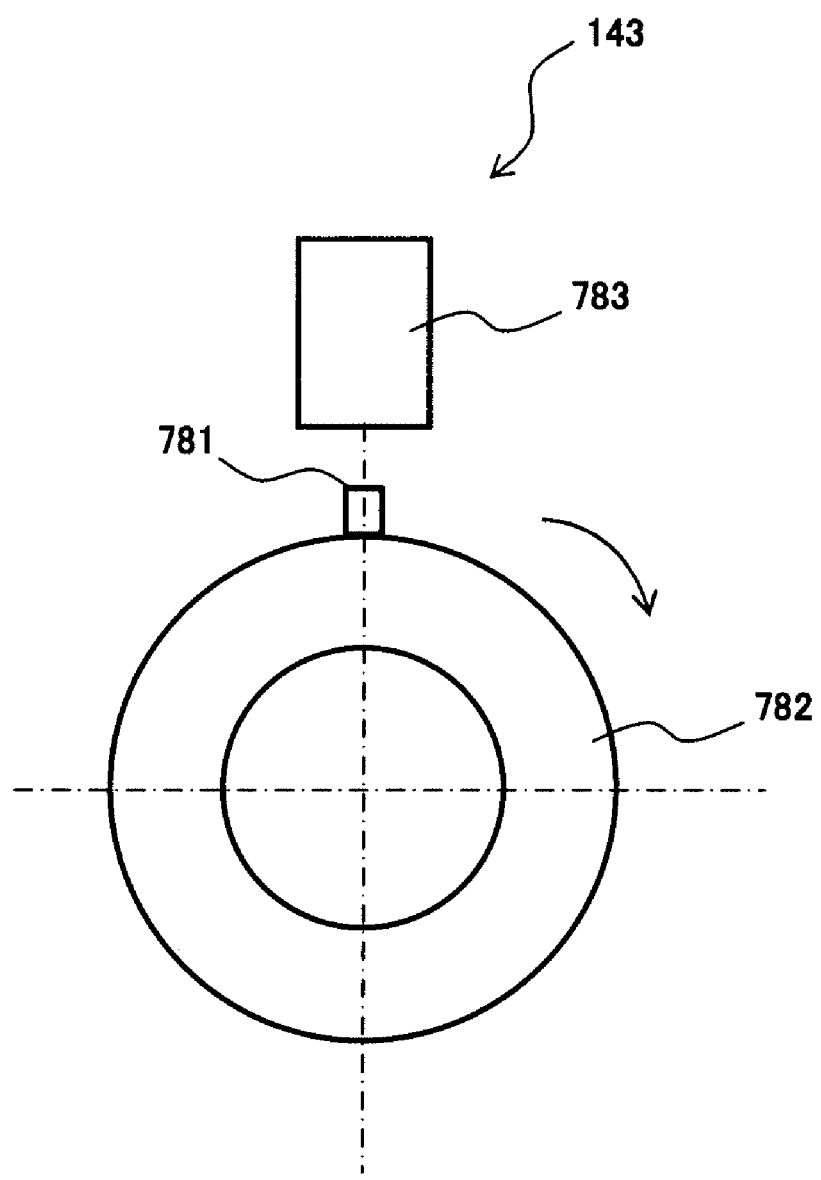
FIG. 29 is another structure of the second cam angle sensor according to the second embodiment of the present invention.

Furthermore, a cam angle sensor of configuration shown in FIG. 29 can be used as second cam angle sensor 143 which is combined with crank angle sensor 147 shown in FIG. 28.

Figure 30:
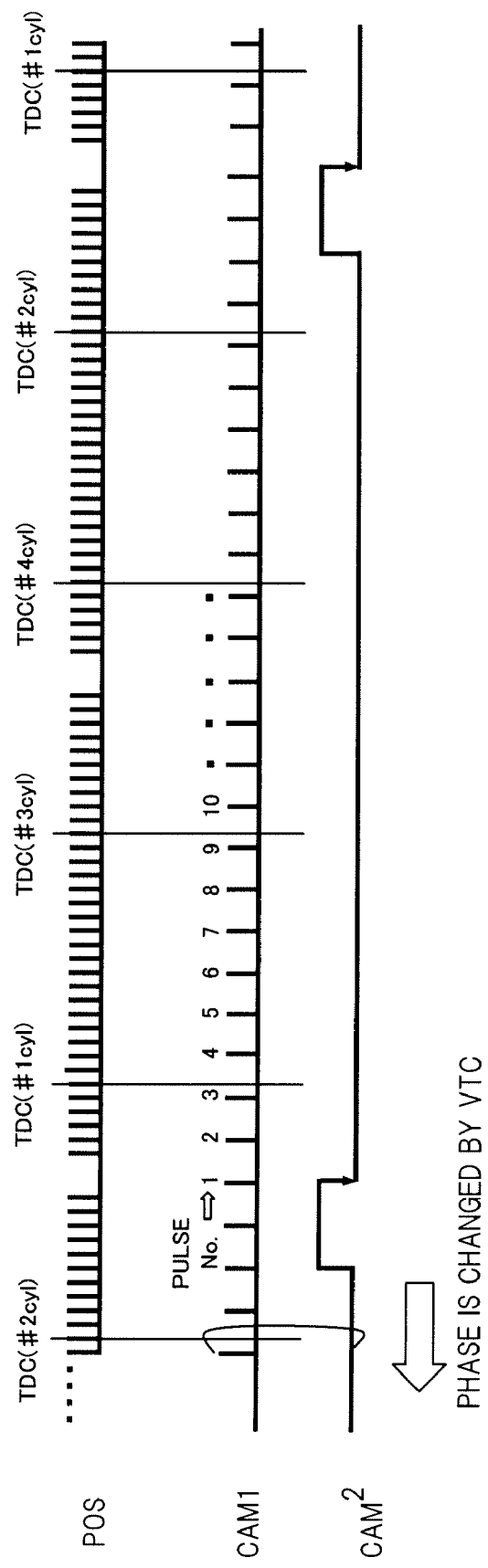
FIG. 30 is a time chart illustrating the correlation between the second cam angle signal CAM2 output from the second cam angle sensor shown in FIG. 29, and the unit crank angle signal POS output from the crank angle sensor shown in FIG. 28.

Second cam angle sensor 143 shown in FIG. 29 is axially supported on camshaft 134 and comprises: a signal plate 782 disposed with one protruding portion 781 as a portion for being detected on a periphery thereof; and a pickup 783 fixed to engine 101 for detecting that the portion for being detected (protruding portion 781) of signal plate 782 comes close Accordingly, as shown in FIG. 30, second cam angle sensor 143 outputs the second cam angle signal CAM2 of one pulse per two rotations of crankshaft 120, and an output position of the second cam angle signal CAM2 is set just before the portion at which the unit crank angle signal POS is not output.

In other words, the unit crank angle signal POS is not output before the top dead center of #1 cylinder and also before the top dead center of #4 cylinder. The output of the second cam angle signal CAM2 just before the portion at which the unit crank angle signal POS is not output, is limited to only before the top dead center of #1 cylinder, and accordingly, the second cam angle signal CAM2 is not output just before the portion at which the unit crank angle signal POS is not output, before the top dead center of #4 cylinder.

Consequently, if the second cam angle signal CAM2 is output just before the portion at which the unit crank angle signal POS is not output, the present portion at which the unit crank angle signal POS is not output is before the top dead center of #1 cylinder. Otherwise, if the second cam angle signal CAM2 is not output just before the portion at which the unit crank angle signal POS is not output, the present portion at which the unit crank angle signal POS is not output is before the top dead center of #4 cylinder.

Further, the top dead center at the time point when crankshaft 120 is further rotated by 180 deg from the portion at which the unit crank angle signal POS is not output (the generation time point of the reference angle position signal VTCREF) can be judged based on the discrimination result in the portion at which the unit crank angle signal POS is not output. If the top dead center of #1 cylinder is detected in the previous portion at which the unit crank angle signal POS is not output, it is judged that #3 cylinder is on the top dead center at the time point when crankshaft 120 is further rotated by 180 deg, whereas if the top dead center of #4 cylinder is detected in the previous portion at which the unit crank angle signal POS is not output, it is judged that #2 cylinder is on the top dead center at the time point when crankshaft 120 is further rotated by 180 deg.

Consequently, by judging whether or not the second cam angle signal CAM2 is output just before the portion at which the unit crank angle signal POS is not output (the generation time point of the reference angle position signal VTCREF), the top dead centers of #1 to #4 cylinders can be all detected.

Furthermore, as shown in FIG. 30, the discrimination of the first cam angle signal CAM1 based on the second cam angle signal CAM2 can be performed, for example, by assigning the number for the first cam angle signal CAM1 input after the trailing of the second cam angle signal CAM2 (by counting up the first cam angle signal CAM1) on the basis of an occurrence of trailing of the second cam angle signal CAM2.

Namely, if the first cam angle signals CAM1 are output at 30 deg pitches of cam angle, the cam angle can be detected at 30 deg pitch on the basis of the trailing of the second cam angle signal CAM2. Therefore, similarly to the above embodiment, the time VTCTIM from the unit crank angle signal POS output just before to the first cam angle signal CAM1 is obtained (refer to FIG. 25), so that the rotating phase can be detected at each generation of the first cam angle signal CAM1.

Incidentally, it is possible to assign the number for the first cam angle signal CAM1 input after an occurrence of leading of the second cam angle signal CAM2 (to count up the first cam angle signal CAM1) on the basis of the occurrence of leading of the second cam angle signal CAM2.

Consequently, even in the configuration using second cam sensor 143 and crank angle sensor 147 shown in FIG. 29 and FIG. 28, it is possible to update the detection result of the rotating phase in a sufficiently short cycle, to thereby feedback control variable valve timing mechanism 113 at a high speed with high precision.

Moreover, the signal form of the second cam angle signal CAM2 is simplified in comparison with the cylinder discrimination based on the pulse number, so that the computation process becomes easier and, it also becomes possible to perform the necessary and sufficient detection even in the case where the diameter of signal plate 782 is relatively small. Hence, cam sensor 143 can be miniaturized while allowing layout of the sensor onto the engine to be easily achieved.

Incidentally, the output of the second cam angle signal CAM2 is not limited to just before the portion at which the unit crank angle signal POS is not output. For example, if when the portion at which the unit crank angle signal POS is not output is detected, it is judged whether or not the second cam angle signal CAM2 is output in the previous one rotation of crankshaft 120 so that the cylinder discrimination is performed, there is no need to limit the generation position of the second cam angle signal CAM2.

The entire contents of Japanese Patent Application No. 2007-178643 filed on Jul. 6, 2007 and Japanese Patent Application No. 2008-055062 filed on Mar. 5, 2008, priorities of which are claimed, are incorporated herein by reference.

While only selected embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

I claim:

1. An apparatus for detecting a cam phase of an engine provided with a variable valve timing mechanism capable of varying a rotating phase of a camshaft relative to a crankshaft of the engine, comprising:
   a cam angle sensor which outputs a cam angle signal cyclically at each time when the camshaft rotates by a unit angle, and has a configuration such that an output cycle of the cam angle signals is set to have an angle from one to a coming cam angle signal that is differentiated from the unit angle in one portion per one rotation of the camshaft;
   a crank angle sensor which outputs a crank angle signal at a predetermined angle position of the crankshaft during a rotation thereof; and
   a rotating phase detecting device which receives the cam angle signal and the crank angle signal, respectively, as an input thereto, and detects, through detection of the one portion at which the output cycle of the cam angle signal is set to have the angle differentiated from the unit angle, a cam angle position to which an individual cam angle signal corresponds, to thereby detect the rotating phase based on correlation between the detected cam angle position and a crank angle position detected based on the input of the crank angle signal.

2. The apparatus according to claim 1, wherein the crank angle sensor is configured to output the crank angle signal cyclically at each time when the crankshaft rotates by a unit angle, and an output cycle of the crank angle signals is set to have an angle that is differentiated from the unit angle of the crankshaft in at least one portion per one complete rotation of the crankshaft; and
   the rotating phase detecting device is configured to detect, through detection of the portion at which the output cycle of the crank angle signal is set to have the angle differentiated from the unit angle of the crankshaft, the crank angle position to which an individual crank angle signal corresponds.

3. The apparatus according to claim 1, wherein the crank angle sensor is configured to output the crank angle signal cyclically at each time when the crankshaft rotates by a unit angle, and an output cycle of the crank angle signals is set to have an angle that is differentiated from the unit angle of the crankshaft in at least one portion per one complete rotation of the crankshaft; and
   the rotating phase detecting device comprises:
   a first detecting device which detects a reference cam angle position based on the portion at which the output cycle of the cam angle signal is set to have the angle differentiated from the unit angle of the camshaft;
   a first counting device which counts up the cam angle signals on the basis of the detected reference cam angle position;
   a second detecting device which detects a reference crank angle position based on the portion in which the output cycle of the crank angle signal is set to have the angle differentiated from the unit angle of the crankshaft;
   a second counting device which counts up the crank angle signal on the basis of the detected reference crank angle position; and
   a phase calculating device which calculates the rotating phase based on a counted value by the first counting device and a counted value by the second counting device.

4. The apparatus according to claim 3, wherein the phase calculating device calculates the rotating phase, based on a difference between the counted value by the first counting device and the counted value by the second counting device, and a phase difference between the crank angle signal and the cam angle signal.

5. The apparatus according to claim 3, further comprising:
   a third counting device which counts up the crank angle signals on the basis of the reference cam angle position;
   a timing detecting device which detects discrimination timing based on the counted value by the second counting device; and
   a discriminating device which discriminates a cylinder of which a piston is on a reference position in the discrimination timing, based on a counted value by the third counting device.

6. The apparatus according to claim 5, wherein:
   the third counting device is configured to reset the counted value of the crank angle signal to 0 at each time when the camshaft is rotated by one complete rotation; and
   the timing detecting device is configured to detect the discrimination timing at each angle corresponding to an ignition interval.

7. An apparatus for detecting a cam phase of an engine provided with a variable valve timing mechanism capable of varying a rotating phase of a camshaft relative to a crankshaft of the engine, comprising:
   a first cam sensor configured to output a first cam angle signal at each time when the camshaft is rotated by a unit angle in the entire angle range of the camshaft;
   a crank angle sensor configured to output a unit crank angle signal at each time when the crankshaft rotates by a unit angle and to be set to output no unit crank angle signal in one portion per one complete rotation of the crankshaft;
   a second cam sensor configured to output a second cam angle signal, wherein a signal level of the second cam angle signal is changed from a state in which the signal level is maintained at high level to a state in which the signal level is maintained at low level and vice versa at each half rotation of the camshaft;
   a phase detecting device which detects the rotating phase based on the first cam angle signal, the second cam angle signal and the unit crank angle signal; and
   a cylinder discriminating device which discriminates a cylinder on a specific piston position, based on the signal level of the second cam angle signal on an angle position at which outputting of no unit crank angle signal occurs.

8. An apparatus for detecting a cam phase of an engine provided with a variable valve timing mechanism capable of varying a rotating phase of a camshaft relative to a crankshaft of the engine, comprising:

a first cam sensor configured to output a first cam angle signal at each time when the camshaft is rotated by a unit angle in the entire angle range of the camshaft;

a second cam sensor configured to output one pulse indicative of a second cam angle signal at each one complete rotation of the camshaft;

a crank angle sensor configured to output a unit crank angle signal at each time when the crankshaft rotates by a unit angle and to be set to output no unit crank angle signal in one portion per one complete rotation of the crankshaft;

a phase detecting device which detects the rotating phase based on the first cam angle signal, the second cam angle signal and the unit crank angle signal; and a cylinder discriminating device which discriminates a cylinder on a specific piston position on the basis of an angle position at which outputting of no unit crank angle signal occurs, based on whether or not the second cam angle signal is output at each one complete rotation of the crankshaft.

9. A method for detecting a cam phase of an engine provided with a variable valve timing mechanism capable of varying a rotating phase of a camshaft relative to a crankshaft, comprising the steps of:

generating a cam angle signal cyclically at each time when the camshaft is rotated by a unit angle in the entire angle range of the camshaft;

permitting, at one reference cam angle position per one complete rotation of the crankshaft, generation interval of the cam angle signal to be differentiated from the unit angle;

detecting a portion at which a generation cycle of the cam angle signals has an angle set to be differentiated from the unit angle;

detecting a cam angle position to which individual cam angle signal corresponds, based on the portion at which the generation cycle of the cam angle signal has the angle set to be differentiated from the unit angle;

detecting an angle position of the crankshaft; and detecting the rotating phase based on a detection result of the cam angle position and the angle position of the crankshaft.

10. The method according to claim 9, wherein the step of detecting the angle position of the crankshaft comprises the steps of:

generating the crank angle signal cyclically at each time when the crankshaft rotates by a unit angle;

permitting generation interval of the crank angle signal to be differentiated from the unit angle of the crankshaft at a reference crank angle position;

detecting a portion at which a generation cycle of the crank angle signal has an angle set to be differentiated from the unit angle of the crankshaft; and detecting a crank angle position to which individual crank angle signal corresponds, based on the portion at which the generation cycle of the crank angle signal has the angle set to be differentiated from the unit angle of the crankshaft.

11. A method of detecting a cam phase of an engine provided with a variable valve timing mechanism capable of varying a rotating phase of a camshaft relative to a crankshaft, comprising the steps of:

generating a cam angle signal cyclically at each time when the camshaft is rotated by a unit angle in the entire angle range of the camshaft;

permitting generation interval of the cam angle signal to be differentiated from the unit angle of the camshaft at one reference cam angle position per one complete rotation of the crankshaft;

detecting, at the reference cam angle position, a portion at which a generation cycle of the cam angle signal has an angle set to be differentiated from the unit angle of the camshaft;

counting up a generation number of cam angle signals from the reference cam angle position;

generating a crank angle signal cyclically at each time when the crankshaft of the engine rotates by a unit angle;

permitting generation interval of the crank angle signal to be differentiated from the unit angle of the crankshaft at a reference crank angle position;

detecting, as the reference crank angle position, a portion at which a generation cycle of the crank angle signals has an angle set to be differentiated from the unit angle of the crankshaft;

counting up a generation number of crank angle signals from the reference crank angle position; and calculating the rotating phase, based on the generation number of cam angle signals and the generation number of crank angle signals.

12. The method according to claim 11, wherein the step of calculating the rotating phase comprises the steps of:

computing a difference between the generation number of cam angle signals and the generation number of crank angle signals;

detecting a phase difference between the crank angle signal and the cam angle signal; and calculating the rotating phase, based on the difference between the generation number of cam angle signals and the generation number of crank angle signals and the phase difference.

13. The method according to claim 11, further comprising the steps of:

counting up the generation number of crank angle signals on the basis of the reference cam angle position;

detecting discrimination timing, based on the generation number of crank angle signals from the reference crank angle position; and discriminating a cylinder of which a piston is on a reference portion in the discrimination timing, based on the generation number of crank angle signals on the basis of the reference cam angle position.

14. The method according to claim 13, further comprising the step of:

resetting the generation number of crank angle signals on the basis of the reference cam angle position to 0 at each time when the camshaft is rotated by one complete rotation, wherein the step of detecting the discrimination timing detects the discrimination timing at each angle corresponding to an ignition interval.

15. An apparatus for detecting a cam phase of an engine provided with a variable valve timing mechanism capable of varying a rotating phase of a camshaft relative to a crankshaft of the engine, comprising:

cam angle detecting means for outputting a cam angle signal cyclically at each time when the camshaft is rotated by a unit angle while allowing an output cycle of the cam angle signal to have an angle set to be differentiated from the unit angle in one portion per one complete rotation of the camshaft;

crank angle detecting means for outputting a crank angle signal at a predetermined angle position of the crankshaft; and rotating phase detecting means for receiving the cam angle signal and the crank angle signal, and for detecting, through detection of the portion at which the output cycle of the cam angle signal has the angle differentiated from the unit angle, a cam angle position to which an individual cam signal corresponds, to thereby detect the rotating phase based on a correlation between the detected cam angle position and a crank angle position detected based on the crank angle signal.

16. An apparatus for detecting a cam phase of an engine provided with a variable valve timing mechanism capable of varying a rotating phase of a camshaft relative to a crankshaft of the engine, comprising:

first cam angle detecting means for outputting a first cam angle signal at each time when the camshaft is rotated by a unit angle in the entire angle range of the camshaft;

crank angle detecting means for outputting a unit crank angle signal cyclically at each time when the crankshaft rotates by a unit angle in a manner such that the unit crank angle signal fails to be output in one portion per one complete rotation of the crankshaft;

second cam angle detecting means for outputting a second cam angle signal, wherein a signal level of the second cam angle signal is changed from a state in which the signal level is maintained at high level to a state in which the signal level is maintained at low level and vice versa at each half rotation of the camshaft;

phase detecting means for detecting the rotating phase, based on the first cam angle signal, the second cam angle signal and the unit crank angle signal; and cylinder discriminating means for discriminating a cylinder on a specific piston position, based on the signal level of the second cam angle signal on an angle position at which the unit crank angle signal fails to be output.

17. An apparatus for detecting a cam phase of an engine provided with a variable valve timing mechanism capable of varying a rotating phase of a camshaft relative to a crankshaft, comprising:

first cam angle detecting means for outputting a first cam angle signal at each time when the camshaft is rotated by a unit angle in the entire angle range of the camshaft;

second cam angle detecting means for outputting one pulse indicative of a second cam angle signal at every one complete rotation of the camshaft;

crank angle detecting means for outputting a unit crank angle signal at each time when the crankshaft rotates by a unit angle in a manner such that the unit crank angle signal fails to be output in one portion per one complete rotation of the crankshaft;

phase detecting means for detecting the rotating phase, based on the first cam angle signal, the second cam angle signal and the unit crank angle signal; and cylinder discriminating means for discriminating a cylinder on a specific piston position on the basis of an angle position at which the unit crank angle signal fails to be output, based on whether or not the second cam angle signal is output at each one complete rotation of the crankshaft.

\* \* \* \* \*